United States Patent
Fukuda

(10) Patent No.: US 8,842,336 B2
(45) Date of Patent: Sep. 23, 2014

(54) PRINTING APPARATUS, PRINTING PROGRAM AND PRINTING METHOD CONFIGURED TO CONTROL A WHITE TONED COLOR IN PRINTING

(75) Inventor: Takayuki Fukuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 12/882,138

(22) Filed: Sep. 14, 2010

(65) Prior Publication Data

US 2011/0063641 A1    Mar. 17, 2011

(30) Foreign Application Priority Data

Sep. 15, 2009  (JP) .................................. 2009-213257

(51) Int. Cl.
*G06F 15/00* (2006.01)
*H04N 1/54* (2006.01)
*H04N 1/52* (2006.01)

(52) U.S. Cl.
CPC ... *H04N 1/52* (2013.01); *H04N 1/54* (2013.01)
USPC .............................. 358/1.9; 358/3.23; 347/15

(58) Field of Classification Search
None
See application file for complete search history.

(56) References Cited

U.S. PATENT DOCUMENTS

| | | | | |
|---|---|---|---|---|
| 5,751,433 A | * | 5/1998 | Narendranath et al. | 358/1.9 |
| 6,003,979 A | * | 12/1999 | Schneider et al. | 347/74 |
| 7,313,271 B2 | * | 12/2007 | Tan et al. | 382/162 |
| 2007/0201062 A1 | * | 8/2007 | Watanabe | 358/1.9 |
| 2007/0216920 A1 | * | 9/2007 | Watanabe | 358/1.9 |
| 2008/0259365 A1 | | 10/2008 | Matsuzawa | |

FOREIGN PATENT DOCUMENTS

| | | |
|---|---|---|
| JP | 2004-291459 A | 10/2004 |
| JP | 2007-030188 A | 2/2007 |
| JP | 2008-072366 A | 3/2008 |

* cited by examiner

*Primary Examiner* — Benny Q Tieu
*Assistant Examiner* — Michael Y Tzeng
(74) *Attorney, Agent, or Firm* — Kilpatrick Townsend & Stockton LLP

(57) ABSTRACT

There is provided a printing apparatus which is configured to control a basic color in performing the basic color in a printing medium. The printing apparatus includes: a table in which a correspondence relationship between a grayscale value in image data of the basic color and a color material amount is defined; an obtaining section which is configured to obtain a density range of a color which is to be printed on the basis of the image data of the basic color; and an adjustment section which is configured to adjust a grayscale range of the table so that the grayscale value corresponding to a color material amount range which corresponds to the density range of the color is increased.

7 Claims, 25 Drawing Sheets

FIG. 5

| GRAYSCALE VALUE | LARGE DOT (L) RECORDING RATE | MEDIUM DOT (M) RECORDING RATE | SMALL DOT (S) RECORDING RATE |
|---|---|---|---|
| 0 | 0 | 0 | 1 |
| 1 | 0 | 0 | 2 |
| 2 | 0 | 0 | 3 |
| 3 | 0 | 0 | 4 |
| 4 | 0 | 0 | 5 |
| 5 | 0 | 0 | 6 |
| ⋮ | ⋮ | ⋮ | ⋮ |
| ⋮ | ⋮ | ⋮ | ⋮ |
| ⋮ | ⋮ | ⋮ | ⋮ |
| 127 | 0 | 13 | 0 |
| 128 | 0 | 12 | 0 |
| 129 | 1 | 11 | 0 |
| 130 | 2 | 10 | 0 |
| ⋮ | ⋮ | ⋮ | ⋮ |
| ⋮ | ⋮ | ⋮ | ⋮ |
| ⋮ | ⋮ | ⋮ | ⋮ |
| 253 | 98 | 0 | 0 |
| 254 | 99 | 0 | 0 |
| 255 | 100 | 0 | 0 |

FIG. 6
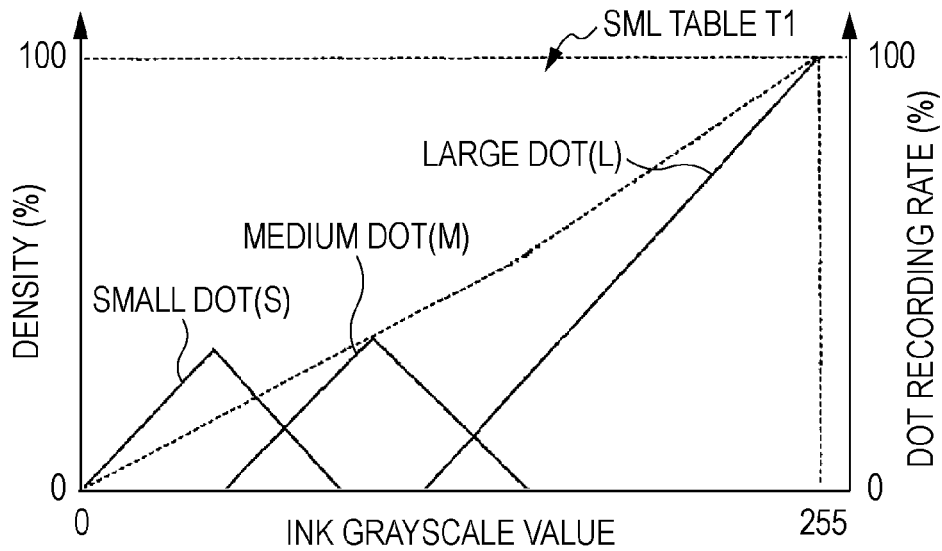
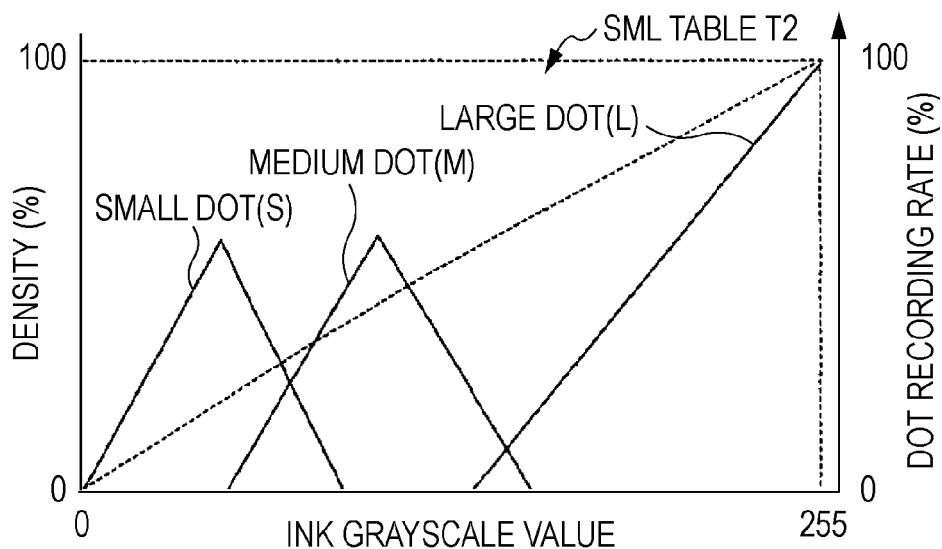
FIG. 7
| INK COLOR | SML TABLE NO. |
|---|---|
| C | 1 |
| M | 1 |
| Y | 1 |
| K | 1 |
| lc | 2 |
| lm | 2 |
| W | 1 |

COLOR IMAGE DATA C DATA
(CMYK 32BIT/PIXEL)

WHITE IMAGE DATA WI DATA
(W 8BIT/PIXEL)

FIG. 11A
WHITE-COLOR PRINTING (W-C PRINTING)
OBSERVATION DIRECTION
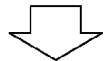
FIG. 11B
COLOR-WHITE PRINTING (C-W PRINTING)
OBSERVATION DIRECTION

FIG. 16A

Lab-CMYK CONVERSION — LUTw1

| L | a | b | VIRTUAL CMYK C | M | Y | K |
|---|---|---|---|---|---|---|
| 95 | 0 | 0 | 0 | 0 | 0 | 0 |
| 94 | 5 | 0 | 0 | 0 | 0 | 0 |
| 94 | 0 | 5 | 0 | 0 | 5 | 0 |
| 94 | 0 | -5 | 3 | 0 | 0 | 0 |
| 94 | -5 | 0 | 3 | 0 | 0 | 0 |
| 93 | 10 | 0 | 0 | 5 | 0 | 0 |
| 93 | 5 | 5 | 0 | 5 | 5 | 0 |
| 93 | 5 | -5 | 3 | 5 | 0 | 0 |
| 93 | 0 | 10 | 0 | 0 | 10 | 0 |
| 93 | 0 | -10 | 6 | 0 | 0 | 0 |
| 93 | -5 | 5 | 3 | 0 | 5 | 0 |
| 93 | -5 | -5 | 6 | 0 | 0 | 0 |
| 93 | -10 | 0 | 6 | 0 | 0 | 0 |
| 92 | 10 | 5 | 6 | 10 | 5 | 0 |
| 92 | 10 | -5 | 3 | 10 | 0 | 0 |
| ... | ... | ... | ... | ... | ... | ... |
| 87 | -10 | 5 | 6 | 0 | 5 | 2 |
| 87 | -10 | -5 | 9 | 0 | 0 | 2 |
| 87 | -10 | -5 | 9 | 0 | 0 | 2 |
| ... | ... | ... | ... | ... | ... | ... |

FIG. 16B

CMYK, T-INK COLOR CONVERSION — LUTw2

| VIRTUAL CMYK,T C | M | Y | K | T | INK COLOR C | M | Y | K | Lc | Lm | W |
|---|---|---|---|---|---|---|---|---|---|---|---|
| 0 | 0 | 0 | 0 | 100 | 0 | 0 | 2 | 0 | 0 | 0 | 255 |
| 0 | 0 | 5 | 0 | 100 | 0 | 0 | 7 | 0 | 0 | 0 | 255 |
| 0 | 0 | 10 | 0 | 100 | 0 | 0 | 12 | 0 | 0 | 0 | 255 |
| 0 | 0 | 15 | 0 | 100 | 0 | 0 | 17 | 0 | 0 | 0 | 255 |
| 0 | 5 | 0 | 0 | 100 | 0 | 0 | 2 | 0 | 0 | 8 | 255 |
| 0 | 5 | 5 | 0 | 100 | 0 | 0 | 7 | 0 | 0 | 8 | 255 |
| 0 | 5 | 10 | 0 | 100 | 0 | 0 | 12 | 0 | 0 | 8 | 255 |
| 0 | 5 | 15 | 0 | 100 | 0 | 0 | 17 | 0 | 0 | 8 | 255 |
| 0 | 10 | 0 | 0 | 100 | 0 | 0 | 2 | 0 | 0 | 15 | 255 |
| 0 | 10 | 5 | 0 | 100 | 0 | 0 | 7 | 0 | 0 | 15 | 255 |
| 0 | 10 | 10 | 0 | 100 | 0 | 0 | 12 | 0 | 0 | 15 | 255 |
| 0 | 10 | 15 | 0 | 100 | 0 | 0 | 17 | 0 | 0 | 15 | 255 |
| 0 | 15 | 0 | 0 | 100 | 0 | 0 | 2 | 0 | 0 | 23 | 255 |
| 0 | 15 | 5 | 0 | 100 | 0 | 0 | 7 | 0 | 0 | 23 | 255 |
| 0 | 15 | 10 | 0 | 100 | 0 | 0 | 12 | 0 | 0 | 23 | 255 |
| 0 | 15 | 15 | 0 | 100 | 0 | 0 | 17 | 0 | 0 | 23 | 255 |
| ... | ... | ... | ... | ... | ... | ... | ... | ... | ... | ... | ... |
| 15 | 5 | 15 | 0 | 50 | 0 | 0 | 26 | 2.5 | 19 | 4 | 200 |
| 15 | 10 | 0 | 0 | 50 | 0 | 0 | 13 | 0 | 23 | 15 | 200 |
| 15 | 10 | 5 | 0 | 50 | 0 | 0 | 16 | 2.5 | 19 | 11 | 200 |
| ... | ... | ... | ... | ... | ... | ... | ... | ... | ... | ... | ... |

| CONDITION | C | M | Y | K | lc | lm | W |
|---|---|---|---|---|---|---|---|
| SMALL DOT | 5 | −1 | −10 | 6 | −6 | 0 | −8 |
| MEDIUM DOT | 7 | −9 | 10 | 2 | −2 | 5 | 4 |
| LARGE DOT | 2 | 2 | 0 | −5 | −1 | 3 | 2 |

FIG. 21

CMYK-INK COLOR CONVERSION    LUTc

| CMYK | | | | INK COLOR | | | | | | |
|---|---|---|---|---|---|---|---|---|---|---|
| C | M | Y | K | C | M | Y | K | Lc | Lm | IW |
| 0 | 0 | 0 | 0 | 0 | 0 | 0 | 0 | 0 | 0 | 0 |
| 0 | 0 | 33 | 0 | 0 | 0 | 83 | 0 | 0 | 0 | 0 |
| 0 | 0 | 66 | 0 | 0 | 0 | 165 | 0 | 0 | 0 | 0 |
| 0 | 0 | 100 | 0 | 0 | 0 | 250 | 0 | 0 | 0 | 0 |
| 0 | 33 | 0 | 0 | 0 | 0 | 0 | 0 | 0 | 83 | 0 |
| 0 | 33 | 33 | 0 | 0 | 0 | 83 | 0 | 0 | 83 | 0 |
| 0 | 33 | 66 | 0 | 0 | 0 | 165 | 0 | 0 | 83 | 0 |
| 0 | 33 | 100 | 0 | 0 | 0 | 250 | 0 | 0 | 83 | 0 |
| 0 | 66 | 0 | 0 | 0 | 64 | 0 | 0 | 0 | 165 | 0 |
| 0 | 66 | 33 | 0 | 0 | 64 | 83 | 0 | 0 | 165 | 0 |
| 0 | 66 | 66 | 0 | 0 | 64 | 165 | 0 | 0 | 165 | 0 |
| 0 | 66 | 100 | 0 | 0 | 64 | 250 | 0 | 0 | 165 | 0 |
| 0 | 100 | 0 | 0 | 0 | 200 | 0 | 0 | 0 | 55 | 0 |
| 0 | 100 | 33 | 0 | 0 | 200 | 83 | 0 | 0 | 55 | 0 |
| 0 | 100 | 66 | 0 | 0 | 200 | 165 | 0 | 0 | 55 | 0 |
| 0 | 100 | 100 | 0 | 0 | 200 | 250 | 0 | 0 | 55 | 0 |
| ⋮ | ⋮ | ⋮ | ⋮ | ⋮ | ⋮ | ⋮ | ⋮ | ⋮ | ⋮ | ⋮ |
| 100 | 66 | 0 | 33 | 200 | 64 | 0 | 83 | 55 | 165 | 0 |
| 100 | 66 | 33 | 33 | 200 | 64 | 83 | 83 | 55 | 165 | 0 |
| 100 | 66 | 66 | 33 | 200 | 64 | 165 | 83 | 55 | 165 | 0 |
| ⋮ | ⋮ | ⋮ | ⋮ | ⋮ | ⋮ | ⋮ | ⋮ | ⋮ | ⋮ | ⋮ |

FIG. 24

| | | CYAN | MAGENTA | YELLOW | BROWN | LIGHT CYAN | LIGHT MAGENTA | WHITE |
|---|---|---|---|---|---|---|---|---|
| | | | | | INK COLOR | | | ICT |
| COLOR IMAGE | INK ABBREVIATION | C | M | Y | K | Lc | Lm | IW |
| | INK CODE | 01H | 02H | 04H | 00H | 11H | 12H | 40H |
| TONED WHITE IMAGE | INK ABBREVIATION | WC | WM | WY | WK | WLc | WLm | W |
| | INK CODE | 81H | 82H | 84H | 80H | 91H | 92H | C0H |

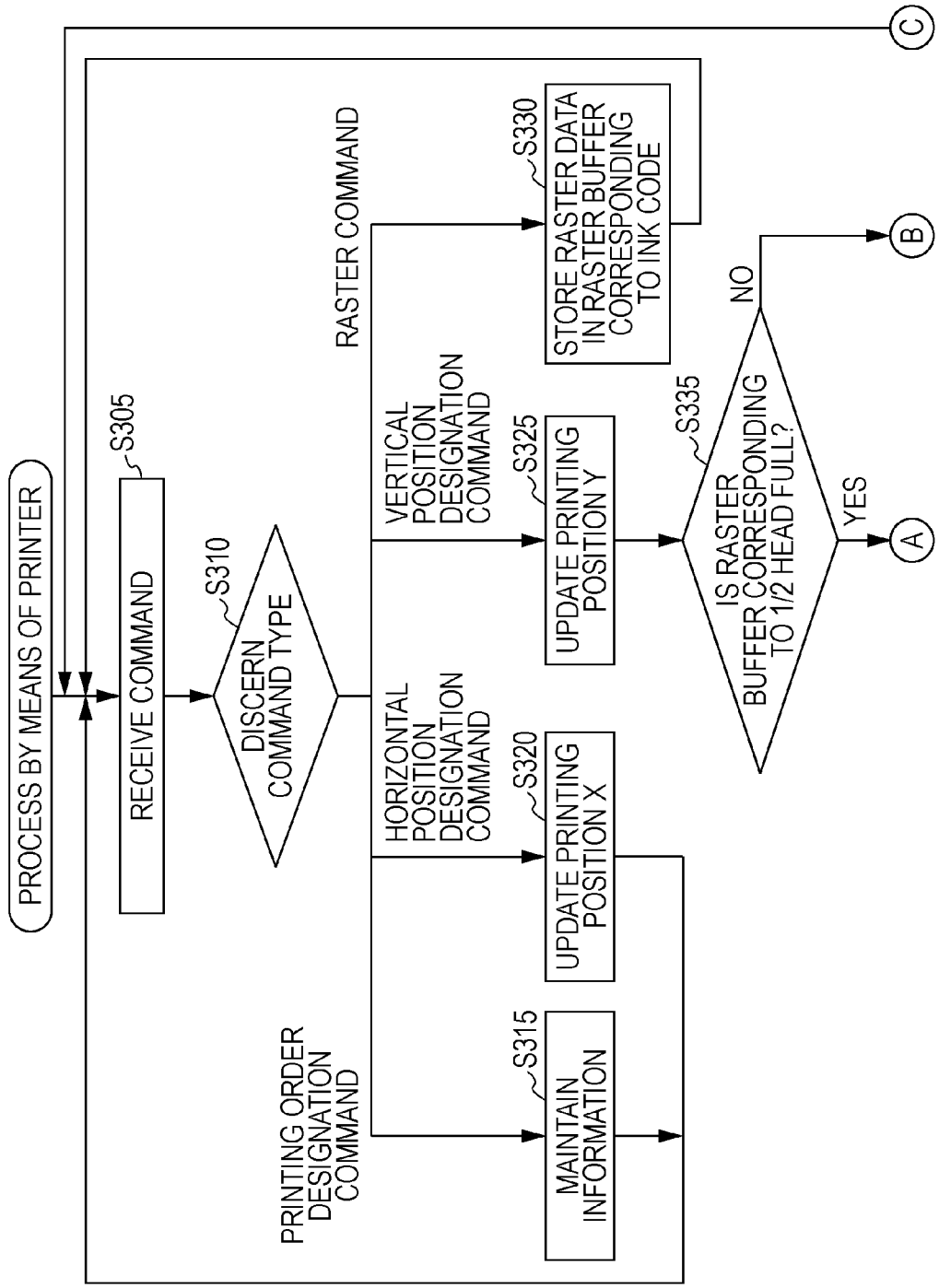

FIG. 27A  W-C PRINTING
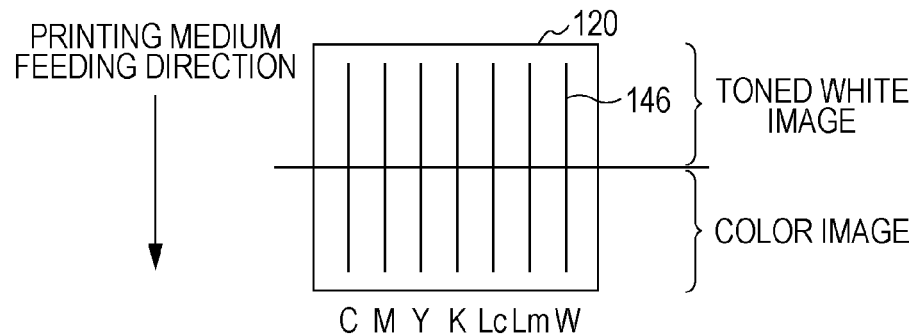
FIG. 27B  C-W PRINTING
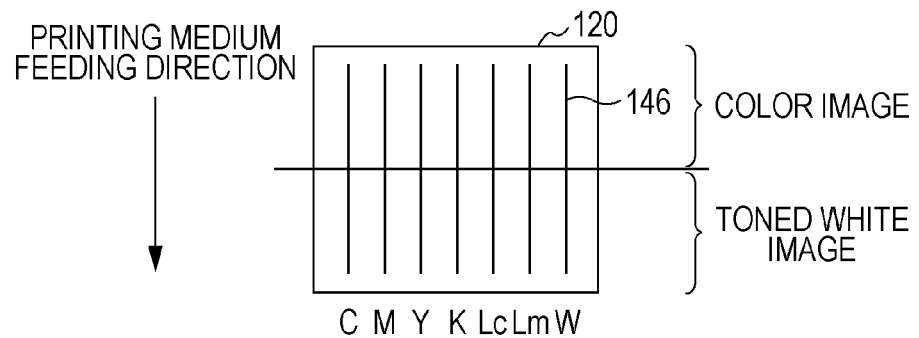
FIG. 27C
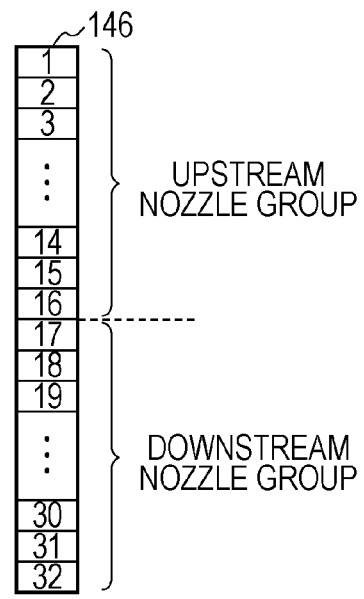

PRINTING APPARATUS, PRINTING PROGRAM AND PRINTING METHOD CONFIGURED TO CONTROL A WHITE TONED COLOR IN PRINTING

Priority is claimed under 35 U.S.C §119 to Japanese Application No. 2009-213257 filed on Sep. 15, 2009, which is hereby incorporated by reference in its entirety.

BACKGROUND

1. Technical Field

The present invention relates to a printing apparatus, a printing program and a printing method, and more particularly, to a printing apparatus, a printing program and a printing method which are configured to control a basic color, in printing the basic color on a printing medium.

2. Related Art

In the related art, when printing is performed in a printer which is provided with an inkjet head, there is known a technique in which printing is performed with dots having two types of sizes of large and small or three types of sizes of large, medium and small by controlling the amount of ink drops which is discharged by one-time ejection. Further, there is known a technique in which printing is performed using larger dots more frequently than the other dots in a case where images of dark colors are printed, and printing is performed using smaller dots more frequently than the other dots in a case where images of light colors are printed, to thereby reduce the feeling of granularity of the images to be printed.

In this way, in a case where the printing is performed using the combination of the plurality of dot sizes, ink recording rate data is created for every dot size of each color using a table which is configured to convert a grayscale value of each ink color into a recording rate of each dot size, to thereby perform the printing.

JP-A-2004-291459 and JP-A-2008-72366 are examples of the related art.

SUMMARY

In the above described techniques, whether color saturation obtained in image data is high or low, the grayscale accuracy can be obtained only in resolution of the LUT which has been prepared in advance.

An advantage of some aspects of the invention is that it provides a printing apparatus, a printing program and a printing method which can adjust the grayscale accuracy capable of being expressed with respect to the color saturation collected by the input image data.

According to an aspect of the invention, there is provided a printing apparatus which is configured to control a basic color in printing the basic color in a printing medium, including: a table in which a correspondence relationship between a grayscale value in image data of the basic color and a color material amount is defined; an obtaining section which is configured to obtain a density range of a color which is to be printed on the basis of the image data of the basic color; and an adjustment section which is configured to adjust a grayscale range of the table so that the grayscale value corresponding to a color material amount range which corresponds to the density range of the color is increased. As the table is adjusted according to the density range of the basic color in this way, resolution of color saturation which is necessary for printing the basic color is enhanced, and the density of the image data of the basic color which is input can be more accurately controlled.

In this respect, according to an alternative aspect of the invention, it is preferable that the adjustment section has a configuration to set the grayscale value so that the grayscale range after the adjustment becomes an equivalent interval with respect to an ink discharge amount.

Further, according to an alternative aspect of the invention, it is preferable that the adjustment section has a configuration to set the grayscale value so that an interval of the density of ink at the time when the ink adheres onto the printing medium according to an ink recording rate corresponding to each grayscale becomes an equivalent interval, with respect to the grayscale range after the adjustment.

Further, according to an alternative aspect of the invention, it is preferable that the adjustment section has a configuration to adjust the grayscale range of the table with respect to a grayscale range which is obtained by adding a predetermined margin to the grayscale range obtained by the obtaining section.

Further, according to an alternative aspect of the invention, it is preferable that the printing apparatus further includes a density designation receiving section which is configured to receive a designation of the density of the basic color, and the obtaining section obtains the density range of the color on the basis of the density which is received by the density designation receiving section.

Further, according to an alternative aspect of the invention, it is preferable that the printing apparatus further includes: data which is configured to define a correspondence relationship between the density of the basic color and a printing mode; and a mode designation receiving section which is configured to receive a designation of the printing mode, and the obtaining section obtains the density range of the color on the basis of the density corresponding to the designated printing mode, with reference to the data.

The above described printing apparatus includes a variety of aspects. For example, the printing apparatus may be embodied in the state of being mounted in other devices, or may be embodied in cooperation with other methods. Further, the invention may be embodied as a printing system including the printing apparatus, a printing method including processes corresponding to a configuration of the printing apparatus, a program for allowing a computer to realize functions corresponding to the configuration of the printing apparatus, a computer readable recording medium in which the program is recorded, and so on. The printing system, the printing method, the printing program and the program recorded medium according to the invention also have the above described functions and effects. Of course, the configurations according to the alternative aspects can be also applied to the printing system, the printing method, the printing program and the program recorded medium as described above.

BRIEF DESCRIPTION OF THE DRAWINGS

The invention will be described with reference to the accompanying drawings, wherein like numbers reference like elements.

FIG. 5 is a diagram illustrating an example of a SML table.

FIG. 6 is a diagram schematically illustrating a correspondence relationship of SML tables as a graph.

FIG. 7 is a diagram illustrating an example of an ink correspondence table.

FIGS. 11A and 11B are diagrams illustrating a printing order of a color image and a toned white image.

FIG. 16 is a diagram partially illustrating an example of a color conversion table for a toned white image.

FIG. 21 is a diagram partially illustrating an example of a color conversion table for a color image.

FIG. 24 is a diagram illustrating an example of an ink code.

FIGS. 27A, 27B and 27C are diagrams illustrating a configuration of a print head of a printer.

DESCRIPTION OF EXEMPLARY EMBODIMENTS

Hereinafter, an exemplary embodiment of the invention will be described in the following order.
1. Configuration of the embodiment
2. Printing process
3. Modification examples
4. Conclusion

1. CONFIGURATION OF THE EMBODIMENT

Figure 1:
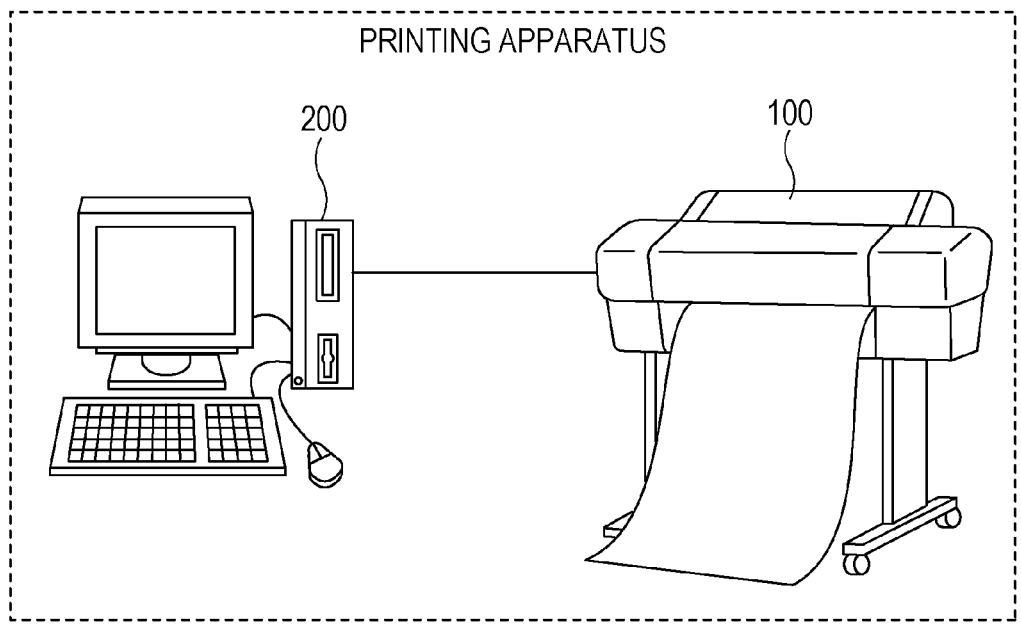
FIG. 1 is a diagram schematically illustrating a configuration of a printing apparatus according to an embodiment of the invention.

FIG. 1 is a diagram schematically illustrating a configuration of a printing apparatus according to an embodiment of the invention. In the figure, the printing apparatus according to the embodiment includes a printer 100 and a personal computer 200 (PC 200). The printer 100 is an ink jet printer which is configured to eject ink and form images on a printing medium. The PC 200 outputs printing control data including image data for printing, control commands or the like to the printer 100, and thus, serves as a printing control device for enabling the printer 100 to perform printing. The printer 100 and the PC 200 are connected to each other through a communication cable, a wireless communication line or the like, for communication.

The printer 100 in the present embodiment is provided with ink of total 7 colors such as cyan (C), magenta (M), yellow (Y), black (K), light cyan (lc), light magenta (lm) and white (W), and performs printing using ink of a color which is appropriately selected form the seven colors. That is, using the W ink, the printer 100 can print a basic color or a color image onto a printing medium, or can perform printing by overlapping the basic color and the color image in a predetermined order onto the printing medium.

For example, the "basic image" is firstly printed on the printing medium such as a transparent film, and then the "color image" is printed, to thereby enable printing of a type in which the color image is formed on the basic color which is a background when seen from a printing surface side of the printing medium. Hereinafter, such a printing type is referred to as a "W-C printing". Further, the color image is firstly printed on the transparent film, and then the basic color image is printed, to thereby enable printing of a type in which the color image is formed on the basic color which is a background when seen from a non-printing surface side of the printing medium. Hereinafter, such a printing type is referred to as a "C-W printing".

Further, in the embodiment which will be described hereinafter, since a case where a color which is almost white as the basic color on the transparent film as the printing medium is printed is described as an example, the "basic color" is also referred to as "toned white". Further, a process in which other colors are mixed into white ink to be adjusted into a desired white color in order to determine the "white toned color" is referred to as "white toning", and images formed by the "white toned color" are referred to as "toned white images".

1-1. Hardware Configuration

Figure 2:
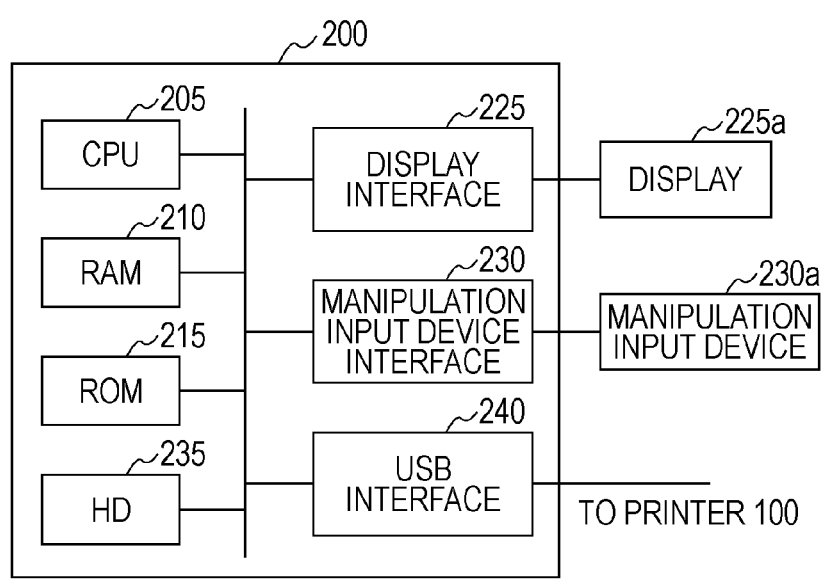
FIG. 2 is a diagram schematically illustrating a configuration of a personal computer (PC).

FIG. 2 is a diagram schematically illustrating a configuration of the PC 200. As shown in FIG. 2, the PC 200 includes a CPU 205, a RAM 210, a ROM 215, a display interface 225 (DIF 225), a manipulation input device interface 230, a hard disc 235 (HD 235), and a USB interface 240. The respective sections 205 to 230 are connected to each other through a communication line such as a bus, and can communicate with each other under the control of a controller such as a chip set. A display 225a which is a display device is connected to the display interface 225. A mouse or a keyboard which is a manipulation input device 230a is connected to the manipulation input device interface 230. The USB interface 240 can communicate with a USB interface 155 of the printer 100.

Figure 3:
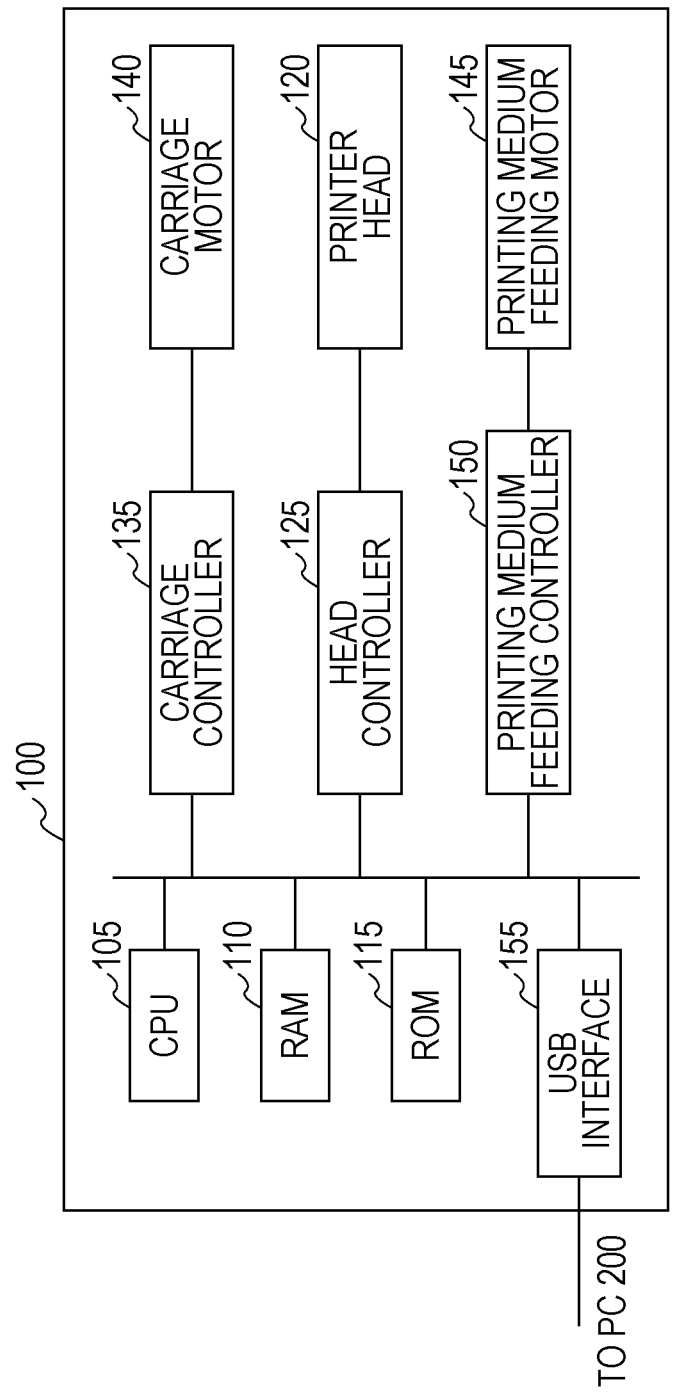
FIG. 3 is a diagram schematically illustrating a configuration of a printer.

FIG. 3 is a diagram schematically illustrating a configuration of the printer 100. As shown in FIG. 3, the printer 100 includes a CPU 105, a RAM 110, a ROM 115, a print head 120, a head controller 125, a carriage to which an ink tank of each color of C, M, Y, K, lc, lm and W is mounted, a carriage controller 135, a carriage motor 140, a printing medium feeding motor 145, a printing medium feeding controller 150 and a USB interface 155. The respective sections 105, 110, 115, 125, 135, 150 and 155 are connected to each other through a communication line such as a bus, and can communicate with each other under the control of the control unit such as a chip set. The CPU 105 performs a calculation process according to a program which is stored in the ROM 115 while using an appropriate RAM as a work area, and thus, serves as the control unit for controlling the entire printer 100.

The printer head 120 includes a nozzle group which ejects ink and is mounted on the carriage. The carriage motor 140 is a driving mechanism for moving the carriage in a predetermined direction (main scanning direction), and operates under the control of the carriage controller 135. The printing medium feeding motor 145 is a driving mechanism for transporting the printing medium in a direction (sub-scanning direction) perpendicular to the main scanning direction, is operated under the control of the printing medium feeding controller 150. Each nozzle of the print head 120 is arranged to correspond to the ink tank of each color, and obtains color ink from the corresponding ink tank for ejection under the control of the head controller 140. The control unit controls the carriage controller 135, the printing medium feeding controller 150 and the head controller 140 to cooperate with each other, to thereby form images on the printing medium.

1-2. Software Configuration

Figure 4:
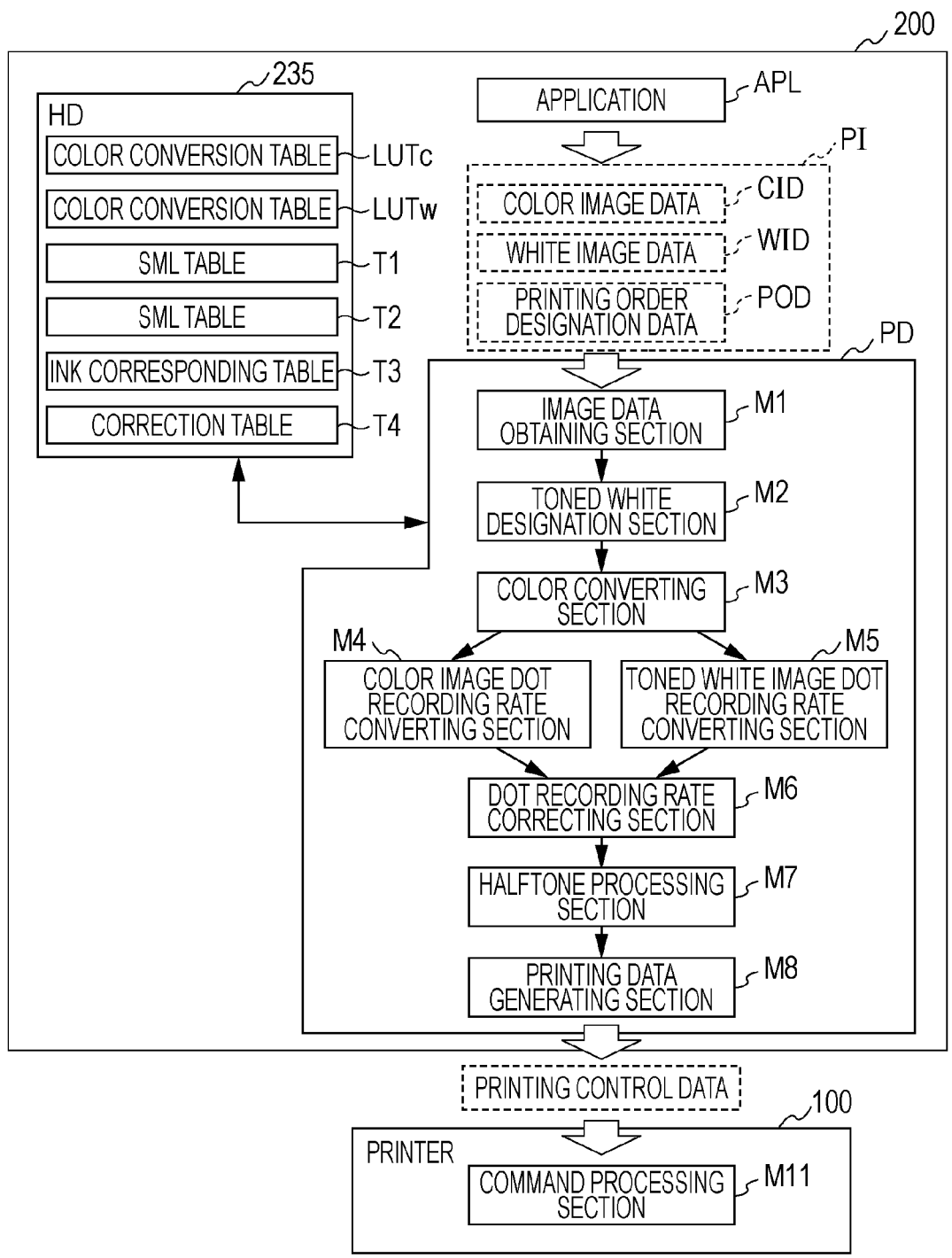
FIG. 4 is a diagram schematically illustrating a configuration of software of a personal computer (PC).

FIG. 4 is a diagram schematically illustrating a software configuration of the PC 200. In the HD 235 of the PC 200 are stored an application program APL, a printer driver PD, a color conversion table for a color image LUTc, a color conversion table for a toned white image LUTw, SML tables T1 and T2 in which a correspondence relationship between a grayscale value of ink color and a dot recording rate (ink ejection amount) of each ink drop of large dots, medium dots, small dots is defined, an ink correspondence table T3 in which a specific SML table used for a specific ink color conversion is defined, and a correction table T4 for correcting an ink ejection amount of the print head 120 of the printer 100 with reference to an ink ejection amount of a standard machine.

The application program APL is a program for generating or editing a printing image PI which is an image to be printed on the transparent film. The application program APL outputs color image data CID, toned white image data WID, and printing order designation data POD for designating the printing order of the color image data CID and the toned white image data WID, to the printer driver PD, in order to enable the printer 100 to print the printing image PI. Details of the data CID, WID and POD will be described with respect to a section 2 (Printing process) which will be described later.

The printer driver PD controls the printer 100 on the basis of the data CID, WID and POD, to thereby realize the printing control of the printing image PI by means of the printer 100.

As shown in FIG. 4, as the printer driver PD is executed in the CPU 205, functions corresponding to an image data obtaining section M1, a toned white designation section M2, a color converting section M3, a color image dot recording rate converting section M4, a toned white image dot recording rate converting section M5, a dot recording rate correcting section M6, a halftone processing section M7, and a printing data generating section M8, are realized.

The image data obtaining section M1 obtains the color image data CID, the toned white image data WID, and the printing order designation data POD which are output by the application program APL. Further, in this embodiment, the color image data CID is CMYK data such as a CMYK color system or the like, for example, of Japan color or the like. The color image data CID may be data expressed by a different color system.

The toned white designation section M2 is a module for designating a basic color image. The toned white designation section M2 designates color data for designating a color obtained by mixing color ink of a plurality of colors in an appropriate ratio, so as to designate the basic color image, data corresponding to an ink coverage factor (hereinafter, referred to as a density setting parameter) which is a rate in which the color ink of the plurality of colors covers a surface per a unit area of the printing medium. The color data can be designated by a combination of brightness L* and color saturation a* and b* in accordance with a Lab color system, for example, and can be designated by a combination of red (R), blue (B), and green (G) in accordance with an RGB color system.

The color converting section M3 converts the color image data CID into a grayscale value of each ink color provided in the printer 100, with reference to the predetermined color conversion table LUTc which is stored in advance in the HD 235. Further, the color converting section M3 can simultaneously perform a so-called separation process for separating grayscale values of a light ink and a dark ink of the same color. Further, the color converting section M3 converts the color data which is designated by the toned white designation section M2 into the grayscale value of each ink color provided in the printer 100, with reference to the predetermined color conversion table LUTw which is stored in advance in the HD 235.

The color image dot recording rate converting section M4 converts the ink amount of each color of C, M, Y, K, lc and lm into the ink amount of each dot of large dots, medium dots and small dots, with reference to the SML table.

FIG. 5 is a diagram illustrating an example of the SML table, and FIGS. 6A and 6B are diagrams schematically illustrating a correspondence relationship of the SML tables as a graph. In this embodiment, two types of SML tables of an SML table T1 and an SML table T2 are prepared, so that the SML table to be used is selected according to the type of the ink. The SML table T1 and the SML table T2 are approximately the same in a grayscale range in which the dot recording rate of each dot size is generated, but the SML table T1 is defined so that the amount of the large, medium and small dots generated in each grayscale value becomes small, compared with the SML table T2.

As shown in FIG. 5 and FIGS. 6A and 6B, in the conversion of the SML table, the small dots are generated in a region where an input grayscale value is low grayscale, the medium dots are generated in a region where the input grayscale value is medium grayscale, and the large dots are generated in a region where the input grayscale value is high grayscale. In FIG. 5 and FIGS. 6A and 6B, the transverse axis represents grayscale values of C, M, Y, K, lc and lm, and the longitudinal axis represents recording amounts of the large, medium and small ink dots (ejected ink drops). The recording amount of the ink drops corresponds to the number of ink drops ejected from a nozzle of the print head, and corresponds to the number of dots (dot recording rate (%)) formed in a unit area of the printing medium. Further, in the longitudinal axis in the figure, a rate (density) in which the printing medium is covered by the large, medium and small ink drops in each grayscale values is also illustrated, in which the longitudinal axis of the right side represents the density (%), and the longitudinal axis of the left side represents the dot recording rate.

FIG. 7 is a diagram illustrating an example of the ink correspondence table T3 in which the SML tables are defined, which will be referred in conversion of each ink color into a dot recording rate for every dot size. As shown in FIG. 7, in this embodiment, C, M, Y, K and W which are dark color inks correspond to the SML table T1, and lc and lm which are light color inks correspond to the SML table T2.

The toned white image dot recording rate converting section M5 converts the grayscale value of each color of C, M, Y, K, lc, and lm into the dot recording rate for every dot of the large, medium and small dots, with reference to the SML tables which are designated in the ink correspondence table T3. However, in a case where the density designated by the density setting parameter which is output by the toned white designation section M2 is smaller than or equal to a predetermined threshold value, the toned white image dot recording rate converting section M5 rebuilds the SML tables so that the resolution of the range which is smaller than or equal to the density designated by the density setting parameter in the SML tables is increased, and then performs the conversion into the dot recording rate of each dot size.

The dot recording rate correcting section M6 corrects the dot recording rate of each dot size which is created by the color image dot recording rate converting section M4 or the toned white image dot recording converting section M5, so that the difference between the ejection amount in a case where the dot recording rate is designated with respect to a typical printer and the ejection amount in a case where the dot recording rate is designated with respect to the printer 100 according to the present embodiment is compensated. This is because the color conversion table LUTc, the color conversion table LUTw, and the SML tables T1 and T2 are optimized with respect to the typical printer. Further, if the color conversion table or the SML tables are corrected to correct the variation between the typical printer and the printer 100 according to the present embodiment, it is not necessary to correct the dot recording rate by the dot recording rate correcting section M6.

The halftone processing section M7 digitizes the dot recording rate generated with respect to each dot size into ejection and non-ejection of ink for every pixel, and generates halftone image data for specifying the amount of the ink to be ejected.

The printing data generating section M8 receives the halftone image data and sorts the halftone image data in a usage order in the printer 100, and sequentially outputs the halftone image data to the printer 100 as a data unit used in one main scanning.

Figure 8:
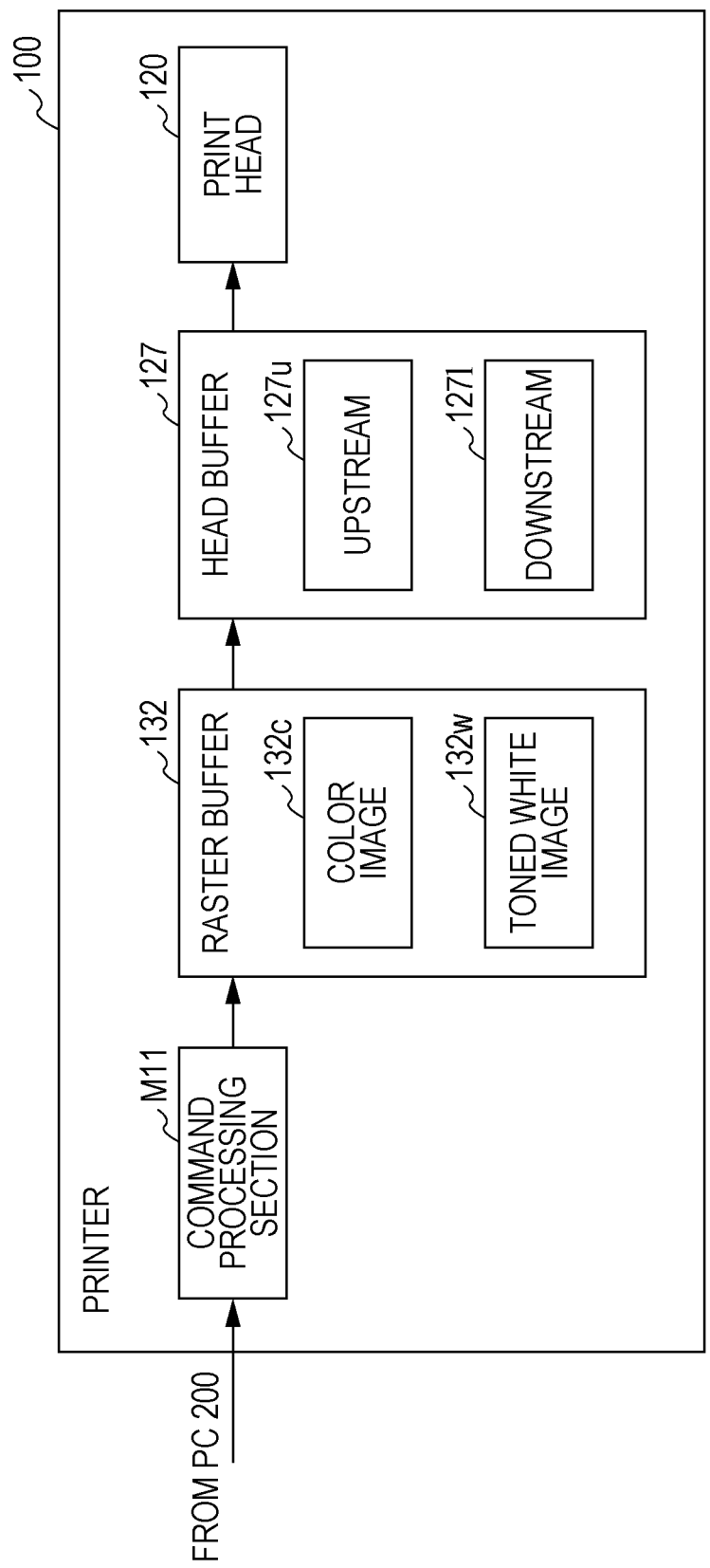
FIG. 8 is a block diagram illustrating a software configuration of a printer.

FIG. 8 is a block diagram illustrating a configuration of software of the printer 100. The printer 100 executes the control program such as firmware which is stored in the ROM 115 in the control unit, to thereby realize a function corresponding to the command processing section M11. The command processing section M11 performs a process according to a command received from the PC 200.

Further, the RAM 115 of the printer 100 forms a raster buffer 132. The raster buffer 132 includes a color image raster buffer 132c and a toned white image raster buffer 132w. In addition, the head controller 125 of the printer 100 includes the head buffer 127. The head buffer 127 includes an upstream head buffer 127u and a downstream head buffer 127l.

2. PRINTING PROCESS

Figure 9:
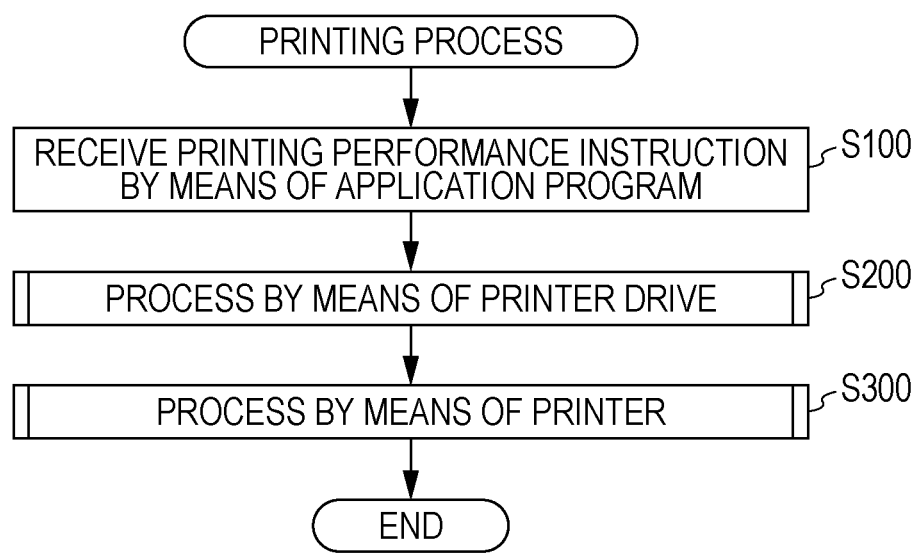
FIG. 9 is a flowchart schematically illustrating a printing process.

FIG. 9 is a flowchart schematically illustrating a printing process which is performed by the printing apparatus according to the present embodiment.

In step S100 (hereinafter, the term "step" will be omitted), if the CPU 105 which executes the application program APL receives a printing performance instruction from a user, the CPU 105 outputs the color image data CID, the white image data WID and the printing order designation data POD to the printer driver PD. Hereinafter, each data output by the application program APL will be described.

Figure 10A:
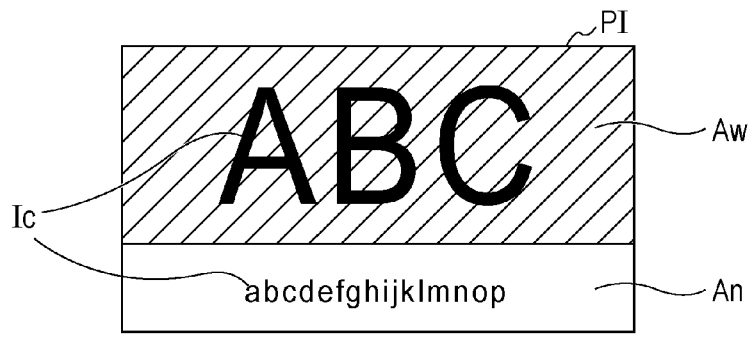
FIGS. 10A, 10B and 10C are diagrams illustrating an example of color image data, white image data and a printing image.
Figure 10B:
Figure 10C:
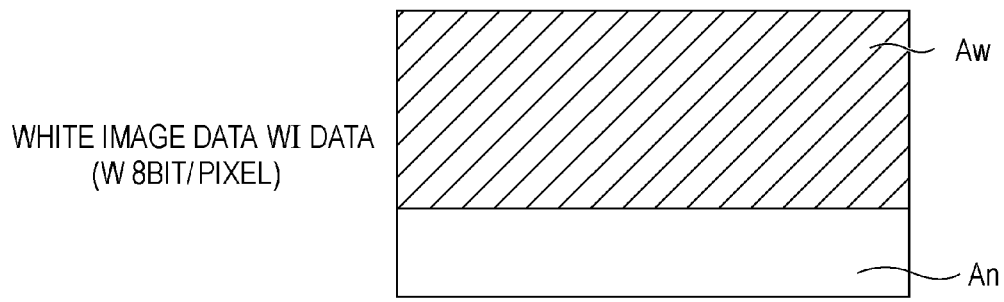

FIGS. 10A, 10B and 10C are diagrams illustrating an example of the color image data CID, the white image data WID and the printing image PI which is formed by the image data. Here, FIG. 10A illustrates an example of the printing image PI; FIG. 10B illustrates an example of the printing image in a case where only the color image data CID is printed; and FIG. 10C illustrates an example of the printing image in a case where only the toned white image data WID is printed.

As shown in FIGS. 10A, 10B and 10C, the printing image PI is provided with a white area Aw and a non-white area An. Further, the printing image PI includes a color image Ic which is exemplified as "ABC" in the white area Aw, and a color image Ic which is exemplified as "abcd . . . nop" in the non-white area An. That is, in the example as shown in FIGS. 10A, 10B and 10C, the color image Ic is formed in at least part of the white area Aw, and the toned white image Iw is formed in at least part of the non-white area An.

The color image data CID is data that colors of respective pixels of the image data for printing only the color image Ic are specified as a C value, an M value, a Y value and a K value of 8 bits, respectively.

The white image data WID is data that color of each pixel of the printing image PI in a case where the color image Ic is removed from the printing image PI is specified as the W value of 8 bits. Herein, the W value which is obtained is digitized, which is any one of 0 and 255. That is, the white image data WID becomes data (W=255) indicating that the toned white image is formed with respect to the pixels which belong to the white area Aw of the printing image PI, and becomes data (W=0) indicating that the toned white image is not formed with respect to the remaining pixels (pixels which belong to the non-white area An).

FIGS. 11A and 11B are diagrams illustrating the printing order of the color image and the toned white image. Here, FIG. 11A illustrates the printing order in which the toned white image Iw is formed on the transparent film, and the color image Ic is formed on the toned white image Iw. The printing order corresponds to the above described "W-C printing". FIG. 11B illustrates the printing order in which the color image Ic is formed on the transparent film, and the toned white image Iw is formed on the color image Ic. The printing order corresponds to the above described "C-W printing".

A user selects whether the W-C printing is to be performed or the C-W printing is to be performed according to the usage type of a printed matter. That is, if the printed matter is a printed matter which is observed from a printing surface side, the W-C printing is designated; and if the printed matter is a printed matter which is observed from a rear surface side of the printing surface, the C-W printing is designated. The application program APL generates the printing order designation data POD which specifies the printing order designated by the user and outputs the printing order designation data POD to the printer driver PD.

In S200, the printer driver PD creates printing control data which is information demanded for enabling the printer 100 to print a desired printing piece, on the basis of each data input from the application program APL. The application program APL outputs the created printing control data to the printer 100. A detailed description of the process in S200 will be made with reference to section 2-1 (Process by means of the printer driver) which will described later.

In S300, the control unit of the printer 100 controls the respective sections on the basis of the printing control data input from the printer driver PD so as to perform printing. Further, a detailed description of the process in S300 will be made with reference to item 2-2 (Process by means of the printer) which will be described later.

2-1. Process by Means of the Printer Driver

Figure 12:
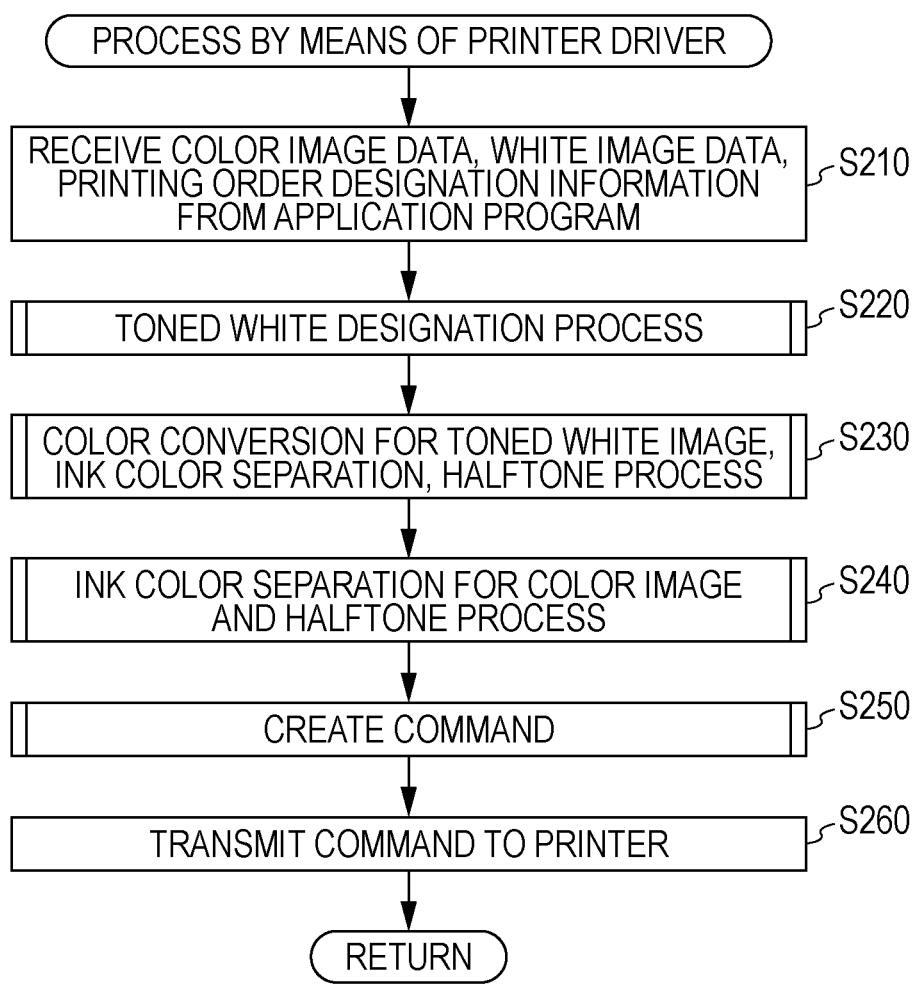
FIG. 12 is a flowchart illustrating a process which is performed by a printer driver.

FIG. 12 is a flowchart illustrating a process which is performed by the printer driver PD in S200.

In S210, the image data obtaining section M1 receives the color image data CID, the white image data WID and the printing order designation data POD which are output from the application program APL.

In S220, the toned white designation section M2 performs a toned white designation process. The toned white designation process refers to a process of designating the toned white image color corresponding to the white area Aw of the printing image PI.

Figure 13:
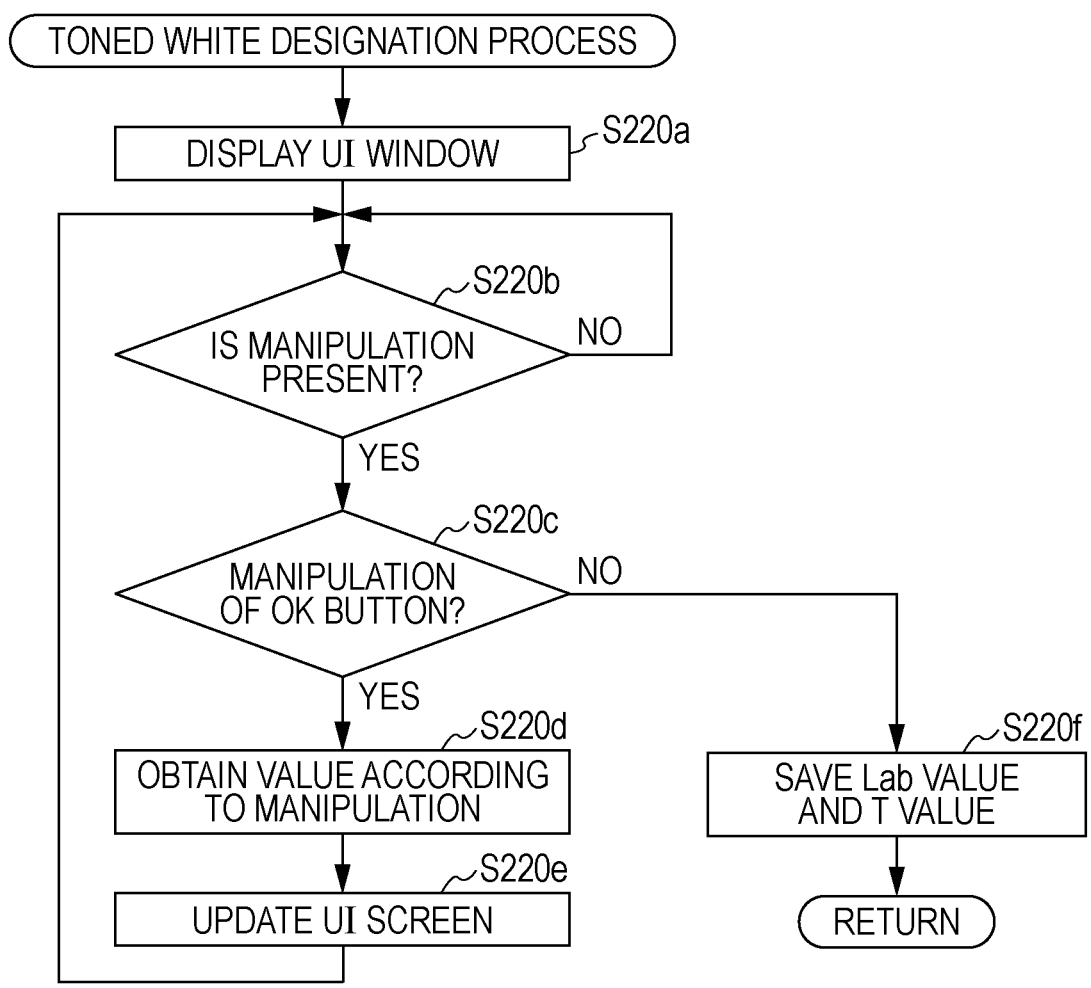
FIG. 13 is a flowchart illustrating a toned white designation process.

FIG. 13 is a flowchart illustrating the toned white designation process. That is, a specific process of S220 corresponds to steps S220a to S220f in the flowchart of the toned white designation process as shown in FIG. 13.

In S220a, the toned white designation section M2 displays a toned white designation UI for receiving a toned white designation from a user on the display 225a.

Figure 14:
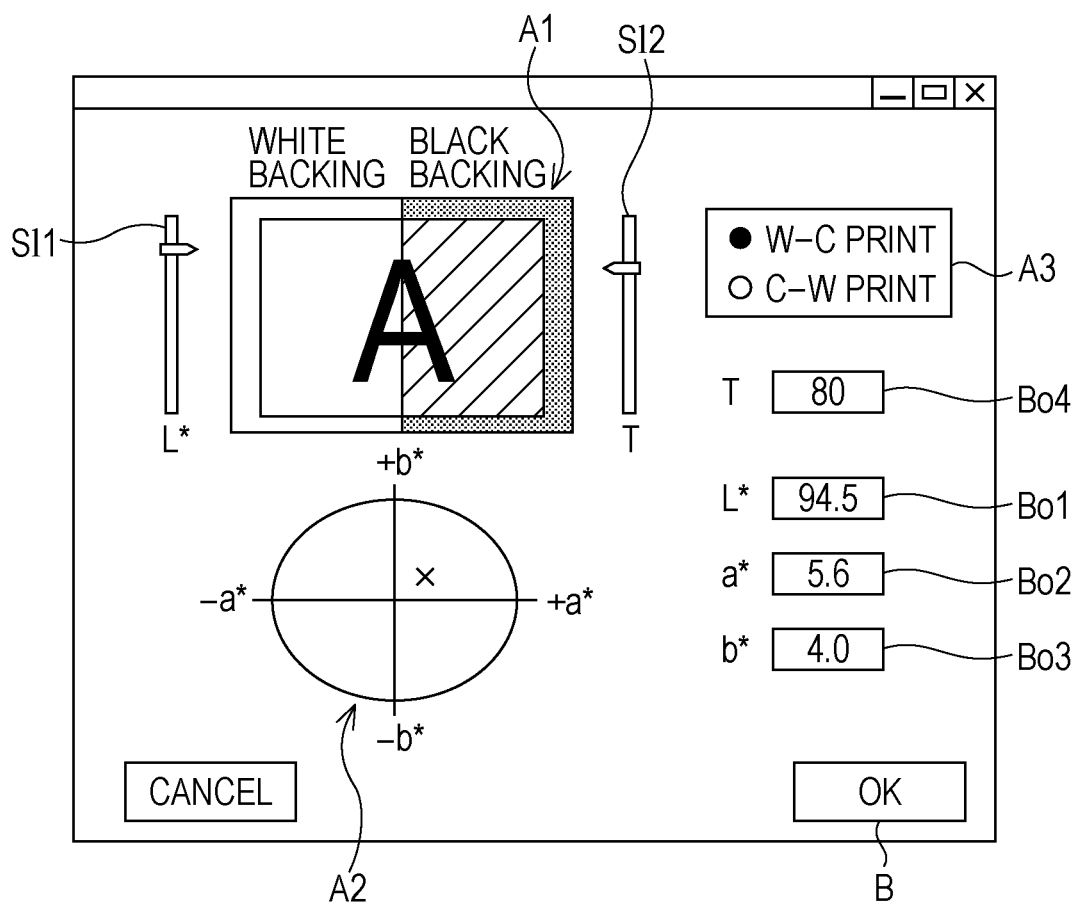
FIG. 14 is a diagram illustrating an example of a toned white designation UI.

FIG. 14 is a diagram illustrating an example of the toned white designation UI. In FIG. 14, the toned white designation UI includes a sample image display area A1, an L value designation slider S11, a T value designation slider S12, a color saturation designation area A2, a printing order designation area A3, an L value input box Bo1, an a value input box Bo2, a b value input box Bo3, a T value input box Bo4, and an OK button B. The toned white designation UI has an initial state where default toned white, that is, a white image corresponding to white image data which is input from the application program APL is displayed in the sample image display area A1, cursors of the respective sliders and the color saturation designation area A2 are disposed in positions corresponding to the default toned white, and values corresponding to the default toned white are displayed in the respective value input boxes.

The sample image display area A1 is an area in which a sample image of the toned white which is designated by means of the respective sliders, designation areas or value input boxes of the toned white designation UI, or according to real measurement results. As shown in FIG. 14, the sample image display area A1 is divided into the left and right areas. The left area represents an area in which the background is white in order to indicate showing of the toned white in a case where the background of a transparent film is white; and the right area represents an area in which the background is black in order to indicate showing of the toned white in a case where the background of the transparent film is black. Further, in the sample image display area A1, a color image is displayed over the left and right areas and hue at the time when the color image is printed on the toned white is displayed.

The respective sliders S11 and S12 and the respective value input boxes Bo1 to Bo4 are sections which are used to designate the toned white color, and specifically designate color which is expressed according to a combination of ink colors ejected when the toned white is printed and a mixture ratio of the respective ink colors.

If the L value designation slider S11 is moved, or a desired L value is input to the L value input box Bo1, the brightness of the toned white is designated. Specifically, the brightness of the toned white is correlated with the amount of the K ink at the time when the toned white image is printed.

If the cursor of the color saturation designation area A2 is moved, or desired a value and b value are input to the a value input box Bo2 and the b value input box Bo3, the color saturation of the toned white is designated. Specifically, the color saturation of the toned white refers to a value for indicating the chromaticity in accordance with a red-green axis and a yellow-blue axis of the toned white, and is correlated with the amount of color ink at the time when the toned white image is printed.

In this respect, each of the values L, a and b corresponds to each value of CIE L*a*b* which are regulated in the CIE (Commission internationale de l'éclairage). Further, in this embodiment, the toned white color is designated by adjusting the respective values L, a and b, but may be designated by the combination of red (R), green (G), and blue (B), or may be designated by adjusting respective values of CIE L*u*v*.

If the T value designation S12 is moved or a desired T value is input to the T value input box Bo4, the density of the toned white is designated. The T value is correlated with the amount of ink per unit area at the time when the toned white image is printed, and is correlated with the transmittance of a background color.

The printing order designation area A3 is an area for designating the printing order of the toned white image and the color image, and the printing order designated by the area is reflected in the printing order designation data POD.

In S220b, the toned white designation section M2 monitors a manipulation input performed through a manipulation input device such as a keyboard or a mouse. If the manipulation input is performed, a process according to the manipulation input is performed, and then, the procedure goes to S220c. Until the manipulation input is performed, the process in S220b is repeatedly performed.

For example, if a user selects any one of the value input boxes Bo1 to Bo3 and inputs a value through a keyboard, the input value is displayed in the L value input box Bo1 and the toned white color displayed in the sample image display area A1 is changed to a color specified by the input value.

Further, if the user selects the T value input box Bo4 and inputs a value through the keyboard, the input value is displayed in the T value input box Bo4, and the transmittance of the toned white background displayed in the sample image display area A1 is changed. At this time, the brightness of the color in the black background area of the sample image display area A1 is changed, but the brightness of the color in the white background area is not changed.

Further, for example, if the user changes the position of the L value designation slider S11 by manipulating the mouse or changes the position of the cursor of the color saturation designation area A2, a value corresponding to the position of the slider or the cursor is obtained, and the toned white color displayed in the sample image display area A1 is changed into a color corresponding to the obtained value.

Further, if the user changes the position of the T value designation slider S12 by manipulating the mouse, the T value corresponding to the position of the slider is obtained, and the transmittance of the toned white color background displayed in the sample image display area A1 is changed. At this time, the brightness of the color in the black background area of the sample image display area A1 is changed, the brightness of the color of the white background area is not changed.

Further, the L value input box Bo1 and the L value designation slider Sll are associated with each other, the respective value input boxes Bo2 and Bo3 and the color saturation designation area A2 are associated with each other, and the T value input box Bo4 and the T value designation slider S12 are associated with each other. That is, if a value is input to each value input box, the position of a slider bar of the corresponding slider or the position of the cursor of the area is changed, and if the position of the slider bar of the slider or the position of the cursor of the area is changed, a value displayed in the corresponding value input box is changed.

In S220c, the toned white designation section M2 determines whether the manipulation input received in S220b corresponds to a manipulation input with respect to the OK button B. In a case where the manipulation input which is received in S220b is the manipulation input with respect to the OK button B, the procedure goes to S220f; and in a case where the manipulation input is not the manipulation input with respect to the OK button B, the procedure goes to S220d.

In S220d, the toned white designation section M2 obtains a value according to the manipulation, and the procedure goes to S220e.

In S220e, the toned white designation unit M2 reflects the value obtained in S220d in each value input box, each slider or the color saturation designation area A2 for display, and updates display of the sample image display area A1 corresponding to the value obtained in S220d, and the procedure returns to S220b and waits for a new manipulation input.

In S220f, the toned white designation section M2 saves the Lab values and the T value which are set in the toned white designation UI at the time when the OK button B is manipulated, in the RAM. The Lab values and the T value of the toned white designated in this way are used by being combined with the white image data WID. That is, the toned white designated by the Lab values and the T value is applied to the pixels to which the data (W=255) indicating that the toned white image is formed in the white image data WID is allocated. Further, in the present embodiment, the white image data corresponding to the Lab values and the T value, that is, the toned white image data is also given the reference code WID. The toned white designation section M2 which performs the process in S220 forms a density designation receiving section in the present embodiment.

In S230, the respective sections M3 to M7 performs a color conversion process, an ink color separation process, a dot recording rate conversion process, a correction process, and a halftone process for the toned white image.

Figure 15:
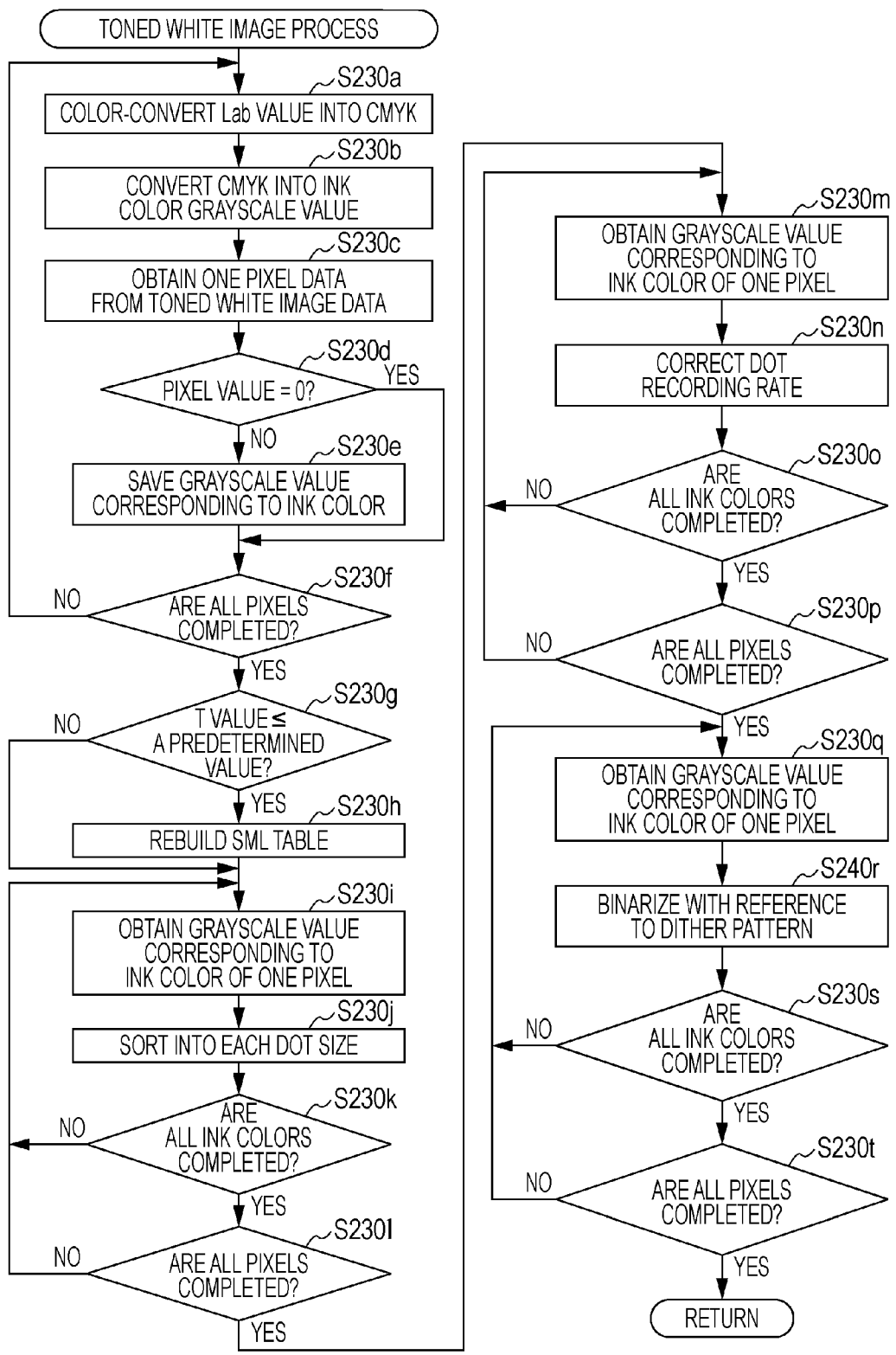
FIG. 15 is a flowchart illustrating the procedure of a color conversion process, an ink color separation process, a dot recording rate conversion process, a correction process, and a halftone process, for a toned white image.

FIG. 15 is a flowchart illustrating the procedure of the color conversion process, the ink color separation process, the dot recording rate conversion process, the correction process, and the halftone process, for the toned white image.

In S230a, the color converting section M3 color-converts the Lab values saved in S220f of the toned white designation process into the CMYK values. The color conversion is performed with reference to the color conversion table LUTw for the toned white image.

FIGS. 16A and 16B are diagrams partially illustrating an example of the color conversion table LUTw for the toned white image. Here, FIG. 16A illustrates the color conversion table LUTw1 which will be referred to at the time of the color conversion from the Lab values to the CMYK values. As shown in the figure, a preset correspondence relationship between the Lab values and the CMYK values is defined in the color conversion table LUTw1. Further, in the color conversion table LUTw1, respective grayscale values of CMYK are defined in 256 grayscales. The color converting section M3 converts the Lab values into CMYK values with reference to the color conversion table LUTw1.

In S230b, the color converting section M3 converts combinations of the CMYK values which are determined in S230a and the T value which is saved in S230f of the toned white designation process into grayscale values corresponding to ink colors. In this embodiment, since printing is performed using ink of total 7 colors of C, M, Y, K, lc, lm and W, the combinations of the CMYK values and the T value are converted into respective grayscale values of the seven ink colors. The ink color separation process is performed with reference to the color conversion table LUTw2 for the toned white image as shown in FIG. 16B.

As shown in FIG. 16B, a correspondence relationship, in which the grayscale values of the respective ink colors correspond to a preset representative combination of the C, M, Y and K values and the T value, is defined in the color conversion table LUTw2. Further, in the color conversion table LUTw2 as shown in the figure, the respective grayscale values of the CMYK are defined in 256 grayscales. The color converting section M3 converts the combinations of the CMYK values and the T value into the grayscale values corresponding to the ink colors with reference to the color conversion table LUTw2.

Further, as shown in FIG. 16B, in the present embodiment, among the ink of the six colors in which the W ink is removed in the white toning, the 4 colors of Y, K, lc and lm are used, and the 2 colors of C and M are not used. That is, in a case where dark ink and light ink are present in the same color, the dark ink is not used but the light ink is used, in the white toning. This is because the light ink is suitable for minutely adjusting the white image. In a case where a color which is far distant from the white color is used as a basic color, this embodiment is not limited thereto.

In S230c, the color converting section M3 extracts data of one pixel in the toned white image data WID.

In S230d, the color converting section M3 determines whether the value of the pixel which is extracted in S230c is a value (W=0) indicating that the toned white image is not formed or a value (W=255) indicating that the toned white image is formed. In a case where W is 0, the procedure goes to S230e, and the grayscale value determined in S230b is saved. Then, the procedure goes to S230f. Further, in a case where W is 255, the procedure skips S230e and goes to S230f.

In S230f, the color converting section M3 determines whether the processes of S230c to S230e are performed with respect to all the pixels of the toned white image. In a case where there is a specific pixel which does not undergo the processes of S230c to S230e, the color converting section M3 selects the specific pixel in S230c and performs the processes of S230c to S230e. In a case where the processes of S230c to S230e are completely performed with respect to all the pixels of the toned white image, the process of S230f is terminated, and then, the procedure goes to S230g.

In S230g, the toned white image dot recording rate converting section M5 determines whether the T value is smaller than or equal to a predetermined threshold value Tx. In the toned white image dot recording rate converting section M5, in a case where the T value is smaller than or equal to the predetermined value Tx, the procedure goes to S230h; and in a case where the T value is larger than the predetermined threshold value Tx, the procedure goes to step S230i.

In S230h, the toned white image dot recording rate converting section M5 rebuilds the SML tables T1 and T2 which is referred to at the time when the toned white image data is converted into an ink recording rate for every dot of a plurality of sizes.

In a case where the grayscale values exactly corresponding to the C, M, Y, K, lc, lm and W values which are created by applying the density setting parameter T to the C, M, Y, K, lc, lm and W values indicating the toned white image are not present in the SML tables T1 and T2, the dot recording rates of large dots, medium dots and small dots are created on the basis of grayscale values which exits around the created C, M, Y, K, lc, lm and W values. Then, printing is performed by a color which is different from a color exactly corresponding to T=18 which is set to indicate minute density by a user in the related art.

Further, in this embodiment, if the density setting parameter falls below, for example, 20%, the SML tables in which resolution having the density of 20% or below is improved are rebuilt. As a result, the dot recording rate which is converted and created in the rebuilt SML tables is improved in resolution of the color saturation.

FIGS. 17A, 17B, 17C and 17D are diagrams illustrating a correspondence relationship between density and an ink coverage factor of a printing result according to the dot recording rate which is converted by the SML table. In this embodiment, the grayscale values of the respective ink colors are determined to be proportional to the dot recording rates of the respective ink colors.

Figure 17A:
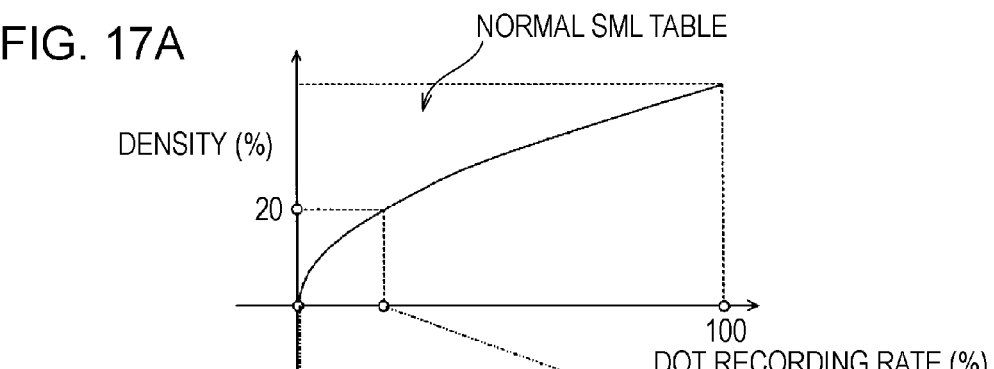
FIGS. 17A, 17B, 17C and 17D are diagrams illustrating a correspondence relationship between density and an ink coverage factor of a printing result by means of a dot recording rate which is converted by an SML table.
Figure 17B:
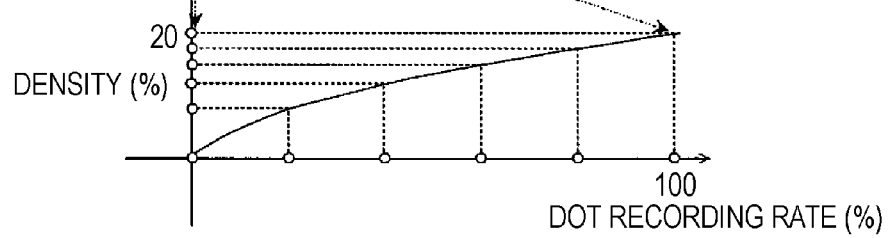
Figure 17C:
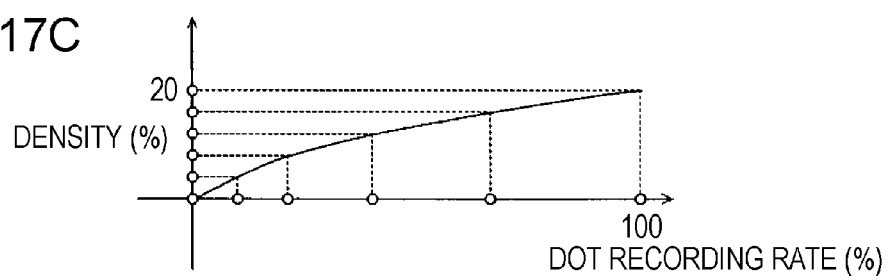

FIG. 17A illustrates a correspondence relationship between density and an ink coverage factor of typical SML tables T1 and T2 which are stored in advance in the HD 235, and FIGS. 17B and 17C illustrates, in a case where the density setting parameter T is 20%, a correspondence relationship between density and a dot recording rate of the SML tables rebuilt by enabling a range of 0 to 20% of the density of the SML tables T1 and T2 to correspond to a dot recording rate 0 to 100%. In the correspondence relationship in FIG. 17B, the grayscale value is set so that the amount of variation in the dot recording rate at the time when the grayscale value is changed by a predetermined value amount becomes constant, and the density corresponding to the dot recording rate corresponding to the set grayscale value is defined. In the correspondence relationship as shown in FIG. 17C, the grayscale value is set so that the density variation amount at the time when the grayscale value is changed by the predetermined amount becomes constant, and the density corresponding to the dot recording rate corresponding to the set grayscale value is defined. If the correspondence relationship is defined in this way, the density variation at the time when the grayscale value of the ink color is increased by 1 is equivalently set over all the grayscale range.

Figure 17D:
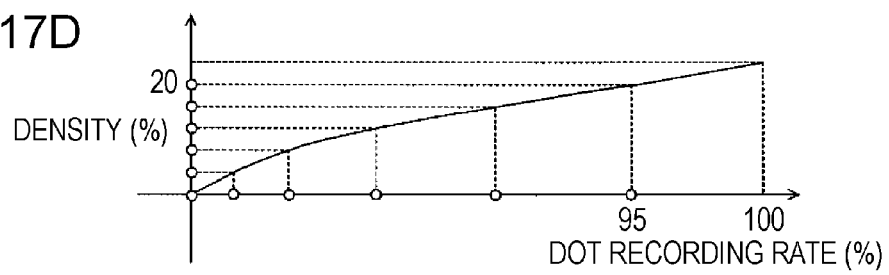

The correspondence relationship as shown in FIG. 17D represents a correspondence relationship between the density and the dot recording rate in the SML tables which are rebuilt by enabling the range of the density 0 to 23% to correspond to the dot recording rate 0 to 100%, of the SML tables T1 and T2, in a case where the density setting parameter T is 20%. That is, a rebuilt range in which the density is thicker than the density designated by the density setting parameter T by a predetermined amount is provided. The allocation of the grayscale value in this case may be linearly made with respect to the dot recording rate as shown in FIG. 17B, or may be linearly made with respect to the density as shown in FIG. 17C. In the example of FIG. 17D, the dot recording rate is hardly saturated when the dot recording rate is corrected to be increased in a correction process which will be described later.

That is, if the density setting parameter falls below the predetermined threshold value, the number of steps of grayscale capable of being set in the grayscale range corresponding to the density range which is smaller than or equal to the threshold value is increased, and the SML tables are rebuilt so that the density range which is smaller than or equal to the threshold value can be designated in more detail. If the printing is performed at the dot recording rate which is converted with reference to the SML tables rebuilt in this way, since more accurate density setting can be performed compared with the SML tables T1 and T2 before rebuilding which is prepared in advance in HD 235, a minute deviation from the density which was originally intended by the user is decreased. Further, the SML tables which are stored in the HD 235 are only T1 and T2. Since it is not necessary to store in advance the SML tables according to the density, the resource capacity is not increased.

In S230i, the toned white image dot recording rate converting section M5 extracts data of one pixel in the toned white image data WID after the color separation expressed by C, M, Y, K, lc, lm and W.

In S230j, the toned white image dot recording rate converting section M5 converts data of the pixel obtained in S230i into each ink amount of large dots, medium dots and small dots, with reference to the SML tables which correspond to the ink correspondence table T3 for every ink color among the SML tables T1 and T2. In this embodiment, in a case where the ink colors of C, M, Y and K are converted, the conversion is performed with reference to the SML table T1; and in a case where the ink colors of lc and lm are converted, the conversion is performed with reference to the SML table T2. At this time, in a case where the SML tables are rebuilt by means of the process of S230h, the conversion is performed into the respective ink amounts of large dots, medium dots and small dots with reference to the rebuilt SML tables.

In S230k, the toned white image dot recording converting section M5 determines whether the dot recording rate conversion process of S230j has been performed with respect to all the ink colors selected in S230i. In a case where there is a specific ink color which does not undergo the dot recording rate conversion process, the dot recording rate conversion process of S230j is performed with respect to the specific ink color, and in a case where the dot recording rate conversion process is completed with respect to all the ink colors of the pixels selected in S230i, the procedure goes to S2201.

In S230l, the toned white image dot recording rate converting section M5 determines whether the processes of S230i to S230k are performed with respect to all the pixels. In a case where there is a specific pixel which does not undergo the processes of S230i to S230k, the specific pixel is selected in S230i to perform the processes of S230i to S230k; and in a case where the processes of S230i to S230k are completed with respect to all the pixels of the toned white image data, the procedure goes to S230m.

In S230m, the dot recording rate correcting section M6 extracts data of one pixel in the toned white image data WID after the color separation expressed by C, M, Y, K, lc, lm and W.

In S230n, the dot recording rate correcting section M6 applies the correction according to an ejection characteristic for every nozzle of the print head 120 to the dot recording rate. The dot recording rate correcting section M6 specifies color correction data which is set for every dot size for every ink color with reference to the correction table T4, and corrects the recording rate by means of the color correction data.

Figures 18, 19:
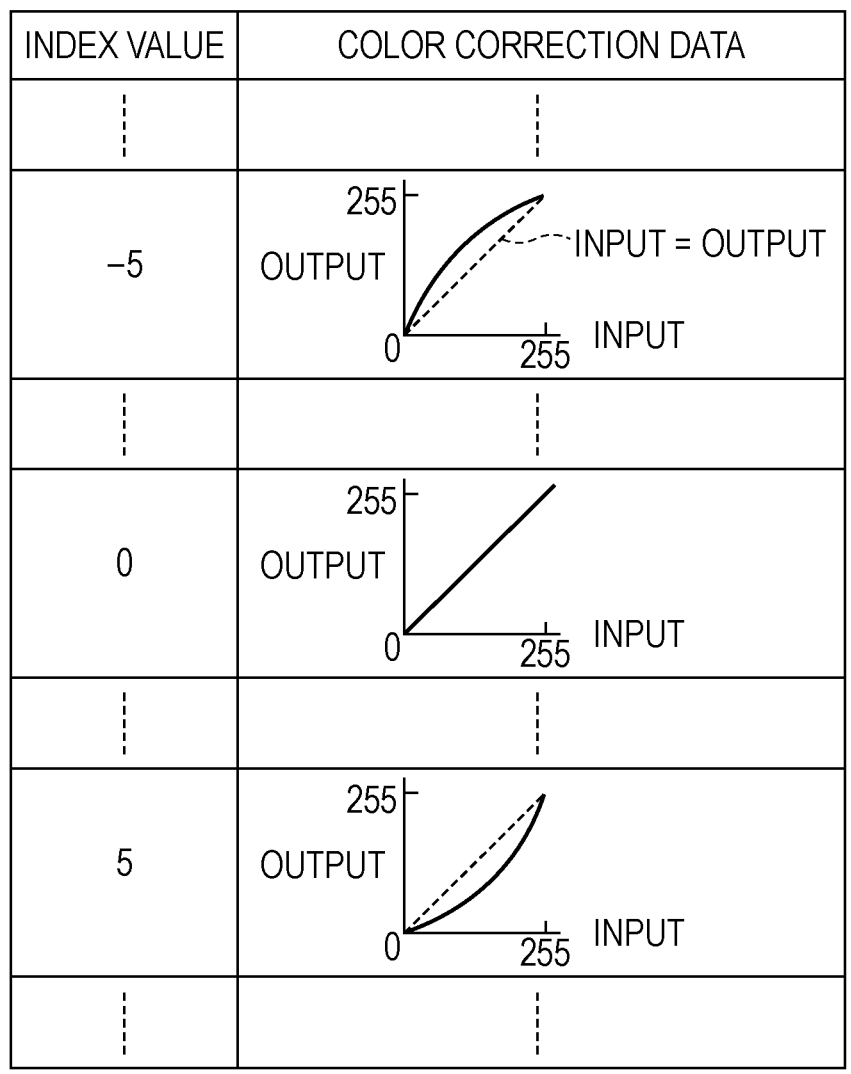
FIG. 18 is a diagram illustrating an example of a correction table.
FIG. 19 is a diagram illustrating an example of color correction data corresponding to each index value of a correction table.

FIG. 18 is a diagram illustrating an example of the correction table T4, and FIG. 19 is a diagram illustrating an example of the color correction data corresponding to each index value of the correction table T4. As shown in FIG. 18, the index value is determined for every ink color and for every dot size, and the ink recording rate of the dot size of the ink color has the dot recording rate corrected by means of color correction data corresponding to the index value designated in the correction table T4. That is, if the ink color and the dot size are specified, the color correction data is specified.

In a case where the index value is a negative value, since a target printer is decreased in the level of color forming on a printing medium compared with a typical printer, the color correction data as shown in FIG. 19 has an output grayscale value higher than an input grayscale value as a whole in order to increase the level of color forming of the printing image. The dot recording rate which is corrected in the color correction data is corrected so that the value thereof is increased as a whole. On the other hand, in a case where the index value is a positive value, since the target printer is increased in the level of the color forming of the printing medium compared with the typical printer, the color correction data has an output gray scale value lower than an input gray scale value is decreased as a whole in order to decrease the level of the color forming of the printing image. The dot recording rate which is corrected in the color correction data is corrected so that the value thereof is decreased as a whole.

At this time, the dot recording rate correcting section M6 converts the dot recording rate into a dot recording rate of an appropriate grayscale value with reference to the above described SML tables. However, in a case where the SML tables are rebuilt, the correction of the dot recording rate is performed on the basis of the color correction data in the rebuilt grayscale range. That is, with respect to the grayscale value corresponding to the dot recording rate which is created in the process of S230$j$, the grayscale value corresponding to the SML tables before rebuilding is calculated, and the color correction data is applied to the grayscale value. The corrected grayscale value is converted into the grayscale value after rebuilding in the same order as in the case where the SML tables are rebuilt, and the ink recording rate in the rebuilt SML tables corresponding to the converted grayscale value is set to the ink recording rate after correction.

In S230$o$, the toned white image dot recording rate converting section M5 determines whether the dot recording rate correction process of S230$n$ has been performed with respect to all the dot sizes of all the ink colors of the pixels selected in S230$m$. In a case where there is a specific dot size of a specific ink color which does not undergo the dot recording rate correction process, the dot recording rate correction process of S230$n$ is performed with respect to the specific dot size of the specific ink color, and in a case where the dot recording rate correction process is completed with respect to all the ink colors of the pixels selected in S230$m$, the procedure goes to S230$p$.

In 230$p$, the dot recording rate correcting section M6 determines whether the processes of S230$m$ to S230$o$ have been performed with respect to all the pixels. In a case where there is a specific pixel which does not undergo the processes of S230$m$ to S230$o$, the specific pixel is selected in S230$m$ to perform the processes of S230$m$ to S230$o$. In a case where the processes of S230$m$ to S230$o$ are completed with respect to all the pixels of the toned white image data, the procedure goes to S230$q$.

In S230$q$, the halftone processing section M7 extracts the grayscale value corresponding to ink color of one pixel.

In S230$r$, the halftone processing section M7 performs a digitization process (halftone process) with reference to a dither pattern for every color. The digitization process is performed with reference to a preset halftone resource HTw for a toned white image. The halftone resource HTw for the toned white image may be set in consideration of filling of the dots in the toned white image.

In S230$s$, the halftone processing section M7 determines whether the digitization process of S230$r$ has been performed with respect to all the ink colors. In a case where there is a specific ink color which does not undergo the digitization process with respect to the pixels selected in S230$q$, the digitization process of S230$r$ is performed with respect to the specific ink color; and in a case where the digitization process is completed with respect to all the ink colors of the pixels selected in S230$q$, the procedure goes to S230$t$.

In S230$t$, the halftone processing section M7 determines whether the processes of S230$q$ to S230$s$ have been performed with respect to all the pixels. In a case where there is a specific pixel which does not undergo the processes of S230$q$ to S230$s$, the specific pixel is selected in S230$q$ to perform the processes of S230$q$ to S230$s$. In a case where the processes of S230$q$ to S230$s$ are completed with respect to all the pixels of the toned white image, the process of S230 is terminated and then the procedure goes to S240.

Figure 20:
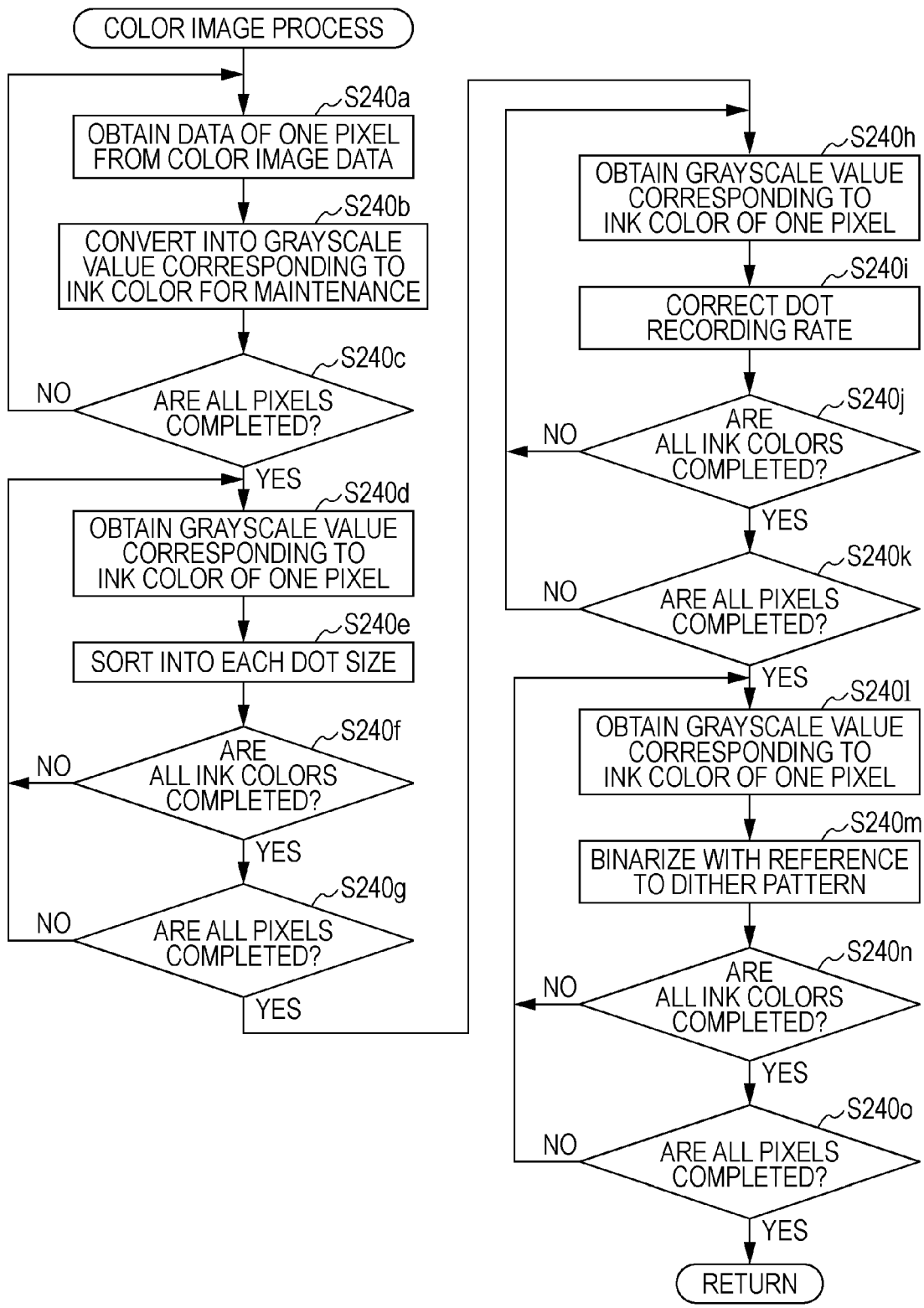
FIG. 20 is a flowchart illustrating the procedure of a color image color conversion, a dot recording rate conversion, and a halftone process.

FIG. 20 is a flowchart illustrating the procedure of the color image color conversion, the dot recording rate conversion, the correction process and the halftone process.

In S240$a$, the color converting section M3 extracts data of one pixel in color image data.

In S240$b$, the color converting section M3 converts the data of one pixel which is extracted in S240$a$ into a grayscale value corresponding to an ink color. As described above, in this embodiment, the printing is performed by means of ink of total 7 colors of C, M, Y, K, lc, lm and W. Accordingly, in the ink color separation process, the values of C, M, Y and K are converted into the respective grayscale values of seven ink colors, with reference to the color conversion table LUTc for the color image.

FIG. 21 is a diagram partially illustrating an example of the color conversion table LUTc for the color image. As shown in FIG. 21, in the color conversion table LUTc, a correspondence relationship between the preset C, M, Y and K values and the respective grayscale values of the ink colors is defined. Further, in the color conversion table LUTc as shown in FIG. 21, the respective grayscale values of the C, M, Y and K are defined in the range which is 0 or more and 100 or less, and the grayscale values of the ink colors are defined in the range which is 0 or more and 255 or less.

Figure 22:
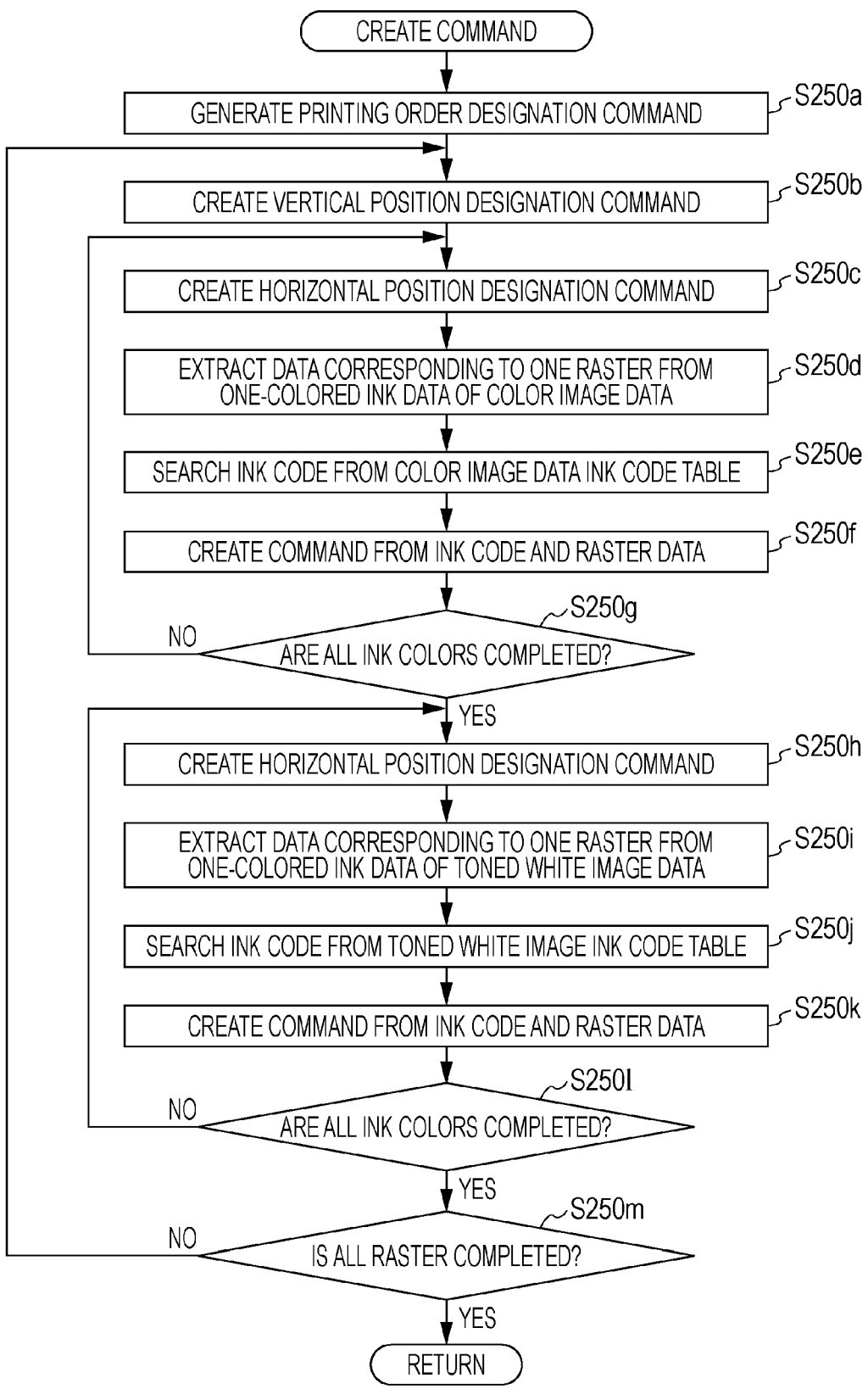
FIG. 22 is a flowchart illustrating a printing control data creating process.

The color converting section M3 converts the C, M, Y and K values into the grayscale values corresponding to the ink colors with reference to the color conversion table LUTc. As shown in FIG. 22, in this embodiment, the color ink of 6 colors of C, M, Y, K, lc and lm is used for forming the color image, and the W ink is not used.

In S240$c$, the color converting section M3 determines whether the conversion into the grayscale value corresponding to the ink color is completed with respect to all the pixels of the color image data. In a case where there is a specific pixel in which the conversion is not completed, the procedure returns to S240$a$ to select the specific pixel, and then the processes of S240$a$ and S240$b$ are repeated until the conversion is completed with respect to all the pixels. In a case where the conversion is completed with reference to all the pixels, the procedure goes to S240$d$.

In S240$d$, the color image dot recording rate converting section M4 extracts data of one pixel in the color image data after the color separation.

In S240$e$, the color image dot recording rate converting section M4 converts the data of the pixel obtained in S240$d$ into the amount of each ink of the large dots, the medium dots and the small dots, with reference to the SML tables defined in the ink correspondence table for every ink color. That is, in a case where the ink colors of C, M, Y and K are converted, the conversion is performed with reference to the SML table T1; and in a case where the ink colors of lc and lm are converted, the conversion is performed with reference to the SML table T2.

In S240$f$, the color image dot recording rate converting section M4 determines whether the dot recording rate converting process of S240$e$ has been performed with respect to all the ink colors of the pixels selected in S240$d$. In a case where there is a specific ink color which does not undergo the dot recording rate converting process, the dot recording rate converting process of S240$e$ is performed with respect to the specific ink color; and in a case where the dot recording rate converting process is completed with respect to all the colors of the pixels selected in S240d, the procedure goes to S240g.

In S240g, the color image dot recording rate converting section M4 determines whether the processes of S240d to S240f have been performed with respect to all the pixels. In a case where there is a specific pixel which does not undergo the processes of S240d to S240f, the specific pixel is selected in S240d to perform the processes of S240d to S240f. In a case where the processes of S240d to S240f are completed with respect to all the pixels of the color image data, the procedure goes to S240h.

In S240h to S240k, the dot recording rate correcting section M6 performs the same processes as the correction processes each corresponding to S230m to S230p which are performed with respect to the toned white image. The correction table T4 and the color correction data specified by the correction table T4 are the same as those used in the toned white image data. However, since the dot recording rate conversion process is performed without rebuilding the SML tables with respect to the color image data, the grayscale value corresponding to the ink recording rate is corrected on the basis of the color correction data, and is corrected into the ink recording rate corresponding to the grayscale value corrected in the SML tables.

In S240l to S240o, the halftone processing section M7 performs the same processes as the halftone processes of S230q to 230t which are performed with respect to the toned white image. In this respect, the digitization process is performed with reference to a halftone resource HTc for the color image which is prepared in advance. If the processes of S240l to S240o are terminated, the process of S240 is terminated, and then, the procedure goes to S250.

In S250, the printing data generating section M8 performs a process of creating command data which is included in printing control data with respect to the printing image PI.

FIG. 22 is a flowchart illustrating the printing control data creating process performed by the printing data generating section M8 in S250.

In S250a, a printing order designation command is created on the basis of the printing order designation data POD which is input from the application program APL or the printing order designation data POD which is designated in the toned white designation UI.

Figure 23A:
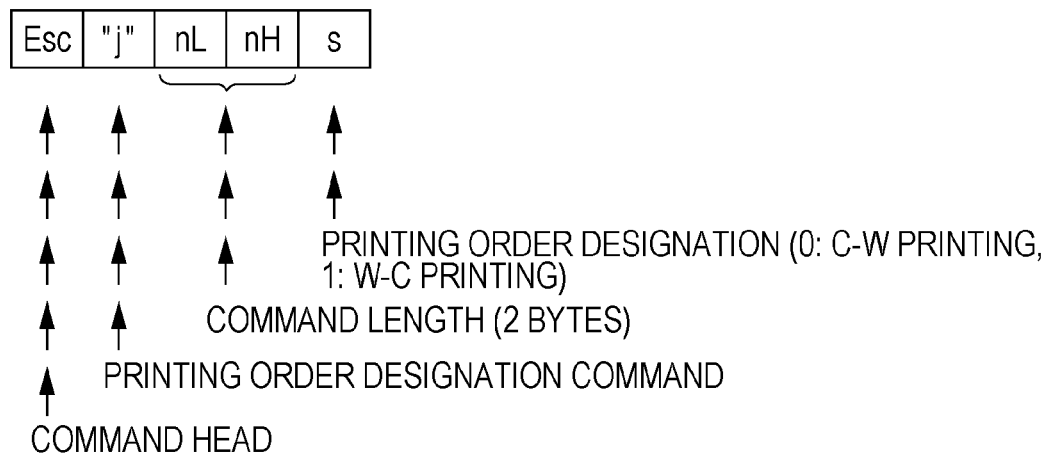
FIGS. 23A and 23B are diagrams illustrating an example of a command which is created in a printing data creating process.
Figure 23B:
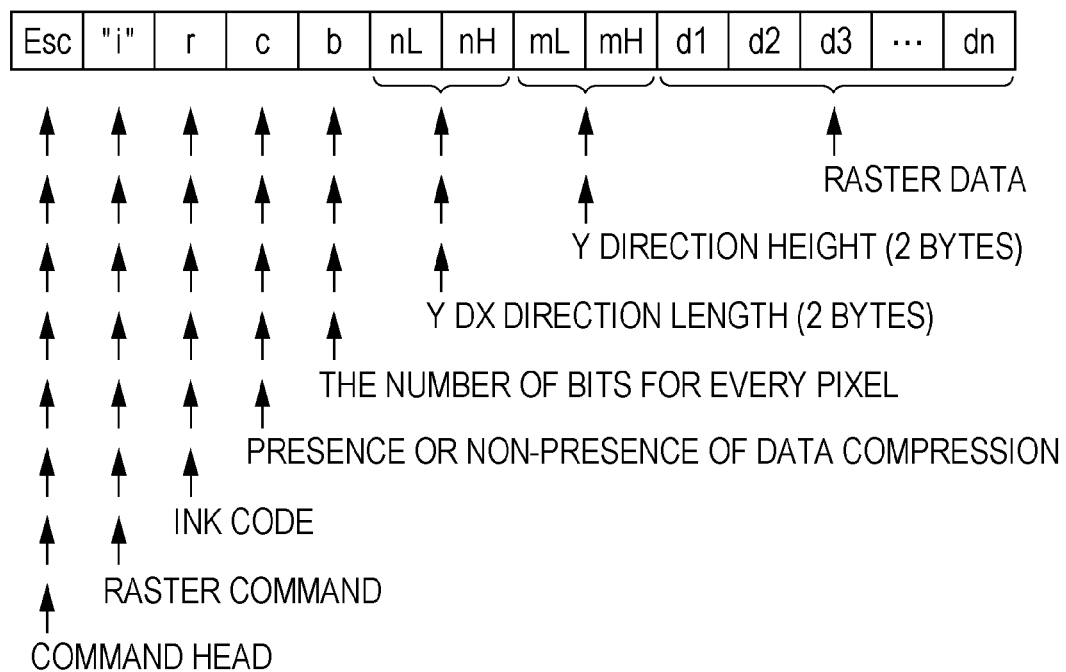

FIGS. 23A and 23B are diagrams illustrating an example of a command which is created in the printing data creating process. Here, FIG. 23A illustrates an example of the printing order designation command. As shown in FIG. 23A, the printing order designation command includes an indicator for indicating a header of the command, an indicator for indicating the printing order designation command, the length of the command (2 bytes in this embodiment) and printing order designation information. For example, in the case where the printing order designation data POD is the "C-W printing", a value of the printing order designation information is "0", and in the case where the printing order designation data POD is the "W-C printing", the value of the printing order designation information is "1".

In S250b, a vertical position designation command is created on the basis of the color image dot data and toned white image dot data output from the halftone processing section M7. The vertical position designation command is a command for designating a starting position of an image in a vertical direction (sub scanning direction: transporting direction of the printing medium). The vertical position designation command is created as a command which is common to the entire ink.

In S250c, a horizontal position designation command is created with respect to one ink color which is selected from the color image dot data. The horizontal position designation command is a command for indicating a starting position of an image in a horizontal direction (main scanning direction) with respect to one ink color at the time when a color image is formed. The printing data generating section M8 specifies the starting position of the color image dot data in the horizontal direction with respect to one ink color and creates the horizontal position designation command for designating the starting position, with reference to the color image dot data with respect to one ink color.

In S250d, dot data corresponding to one raster is extracted with respect to one ink color which is selected from the color image dot data.

In S250e, an ink code of the ink color which is selected in S250d is searched, with reference to an ink code ICT.

FIG. 24 is a diagram illustrating an example of the ink code ICT. As shown in FIG. 24, in the ink code ICT, an abbreviated name and an ink code which are peculiar to each ink color correspond to each other with respect to each ink color. Further, with respect to the same color, ink abbreviated names and ink codes which are different from each other between the color image usage and the toned white image usage are allocated to each ink color.

In S250f, a raster command is created on the basis of the dot data corresponding to one raster which is extracted in S250d and the searched ink code.

FIG. 23B illustrates an example of the raster command. As shown in FIG. 23B, the raster command includes an indicator for indicating a header of the command, an indicator for indicating the raster command, the number of bits per one pixel, the length (2 bytes in this embodiment) in the horizontal direction (X direction), the length (2 bytes in this embodiment) in the vertical direction (Y direction), and raster data (dot data).

In S250g, it is determined whether the processes in S250c to S250f have been performed with respect to all the ink colors used in formation of the color image. In a case where there is a specific ink color which does not undergo the processes of S250c to S250f, the procedure returns to S250c to select the specific ink color and perform the processes of S250c to S250f. The processes of S250c to S250f are repeatedly performed until the processes of S250c to S250f are completely performed with respect to all the ink colors. If the processes of S250c to S250f are completed with respect to all the ink colors, it is determined that the raster command is created corresponding to each ink color used in formation of the color image corresponding to one raster, and then, the procedure goes to S250h.

In S250h, a horizontal position designation command is created with respect to one ink color which is selected from the toned white image dot data. The horizontal position designation command is a command for designating a starting position of an image in the horizontal direction (main scanning direction) with respect to one ink color in formation of the toned white image. The printing data generating section M8 specifies the starting position of the toned white image dot data with respect to one ink color in the horizontal direction and creates the horizontal position designation command for designating the starting position, with reference to the toned white image dot data with respect to one ink color.

In S250i, dot data corresponding to one raster is extracted with respect to one ink color which is selected from the toned white image dot data.

In S250*j*, an ink code of the ink color which is selected in S250*h* is searched with reference to the ink code ICT as shown in FIG. 24.

In S250*k*, the raster command as shown in FIG. 23B is created on the basis of the dot data corresponding to one raster extracted in S250*h* and the searched ink code.

In S250*l*, it is determined whether the processes in S250*h* to S250*k* have been performed with respect to all the ink colors used in formation of the color image. In a case where there is a specific ink color which does not undergo the processes of S250*h* to S250*k*, the procedure returns to S250*h* to select the specific ink color and perform the processes of S250*h* to S250*k*. The processes of S250*h* to S250*k* are repeatedly performed until the processes of S250*h* to S250*k* are completed with respect to all the ink colors. If the processes of S250*h* to S250*k* are completed with respect to all the ink colors, it is determined that the raster command is created corresponding to each ink color used in formation of the color image corresponding to one raster, and then, the procedure goes to S250*m*.

In S250*m*, it is determined whether the processes in S250*b* to S250*l* have been performed with respect to the entire raster of the printing image PI. In a case where there is a specific raster which does not undergo the processes of S250*b* to S250*l*, the procedure returns to S250*b* to select the specific raster and perform the processes of S250*b* to S250*l*. The processes of S250*b* to S250*l* are repeatedly performed until the processes of S250*b* to S250*l* are completed with respect to the entire raster. If the processes of S250*b* to S250*l* are completed with respect to the entire raster, it is determined that the command creation is completed corresponding to each of ink colors used in formation of the color image and the toned white image. Thus, the printing control data creation process is terminated, and then, the procedure goes to S260.

In S260, the printer driver PD transmits the printing control data (printing order designation command, vertical position designation command, horizontal position designation command and raster command) created in S250 to the printer 100. In this way, the processes by means of the printer driver PD are completed.

2-2. Process by Means of the Printer

Figure 25B:
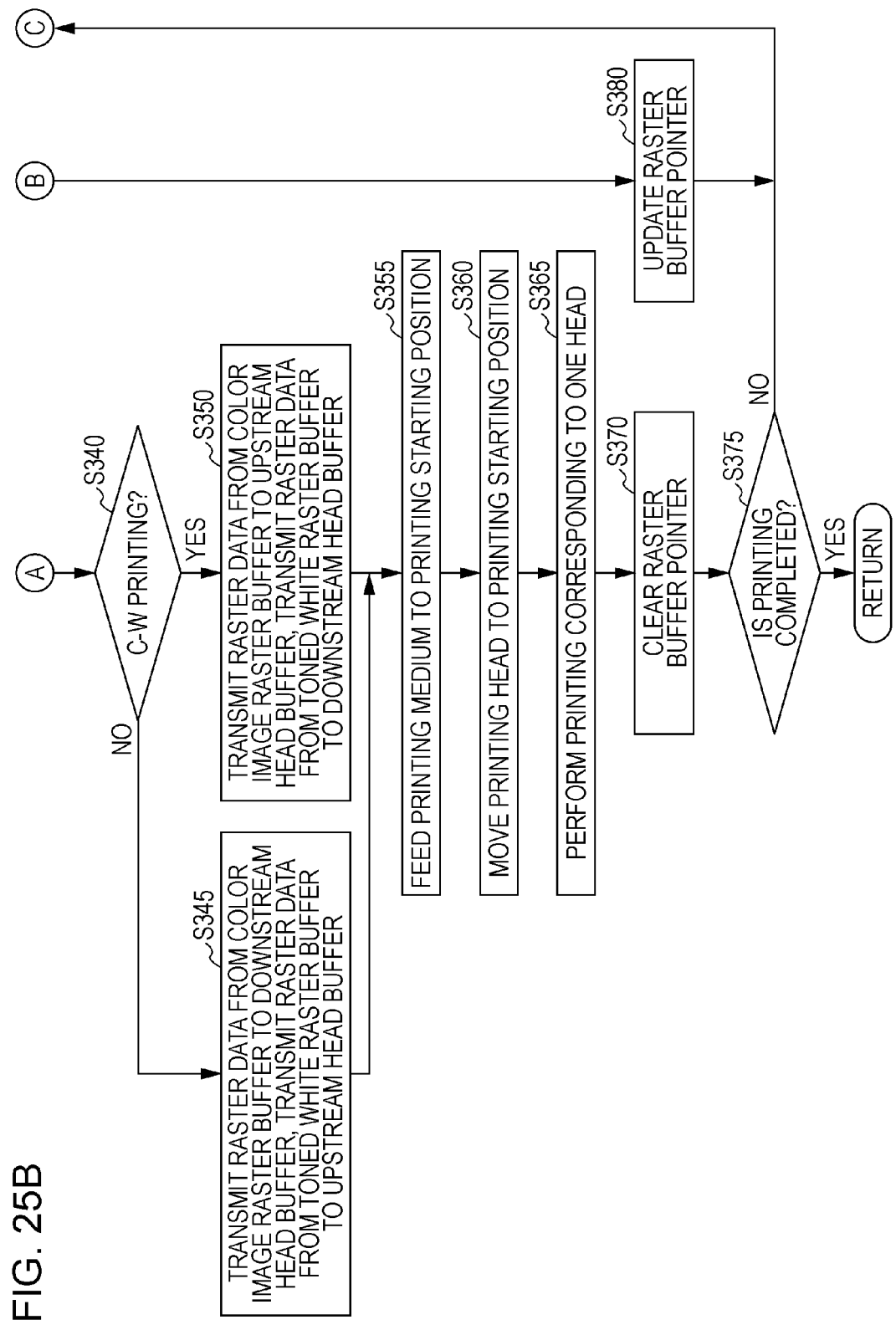
FIG. 25 is a flowchart illustrating a printing process which is performed by a printer.

FIG. 25 is a flowchart illustrating a printing process which is performed by the printer 100 in S300. The processes in FIG. 25 are performed by the command processing section M11 which is performed in the control unit of the printer 100.

In S305, printing control data which is received from the printer driver PD of the personal computer 200 is received.

In S310, the kind of the received command is determined, and any one of the processes of S315 to S330 is performed according to the kind of the command. That is, in a case where the received command is the printing order designation command, the procedure goes to S315; in a case where the received command is the horizontal position designation command; the procedure goes to S320, in a case where the received command is the vertical position designation command, the procedure goes to S325; and in a case where the received command is the raster command, the procedure goes to S330.

In S315, printing order designation information which is designated by the received printing order designation command is stored in the RAM 130. In S320, the horizontal position which is designated by the received horizontal position designation command is updated as a printing starting position X in the horizontal direction. In S325, the vertical position which is designated by the received vertical position designation command is updated as a printing starting position Y in the vertical direction. In S330, the raster data included in the received raster command is stored in the raster buffer 132 corresponding to the ink code.

Figure 26:
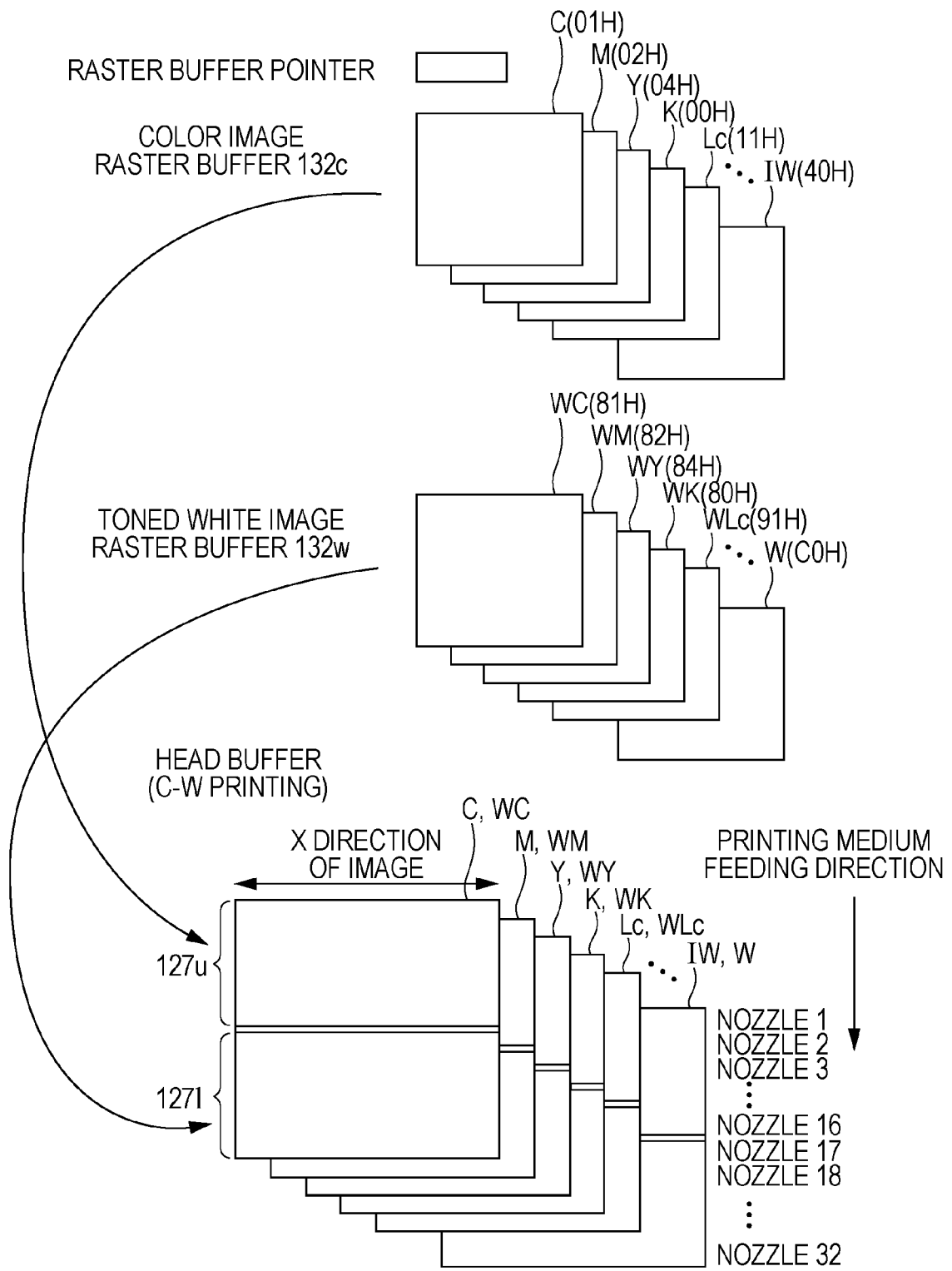
FIG. 26 is a diagram illustrating a detailed configuration of a raster buffer and a head buffer.

FIG. 26 is a diagram illustrating a detailed configuration of the raster buffer 132 and the head buffer 127. In the upper area of FIG. 26 is shown the raster buffer 132*c* for the color image, and in the center area thereof is shown the raster buffer 132*w* for the toned white image. As shown in FIG. 26, the raster buffer 132 is given a region for every ink code. The raster buffer 132*c* for the color image includes a set of the regions corresponding to the respective ink codes for the color image, and the raster buffer 132*w* for the toned white image includes a set of the regions corresponding to the ink codes for the toned white image.

The size of each region of the raster buffer 132 in the X direction corresponds to an image size, the size thereof in the Y direction corresponds to one half or more of the height of the print head 120.

The raster buffer 132 is provided with a Y-directional raster buffer pointer for indicating how much the raster data is received.

In the lower area of FIG. 26, the head buffer 127 is shown. As shown in FIG. 26, the head buffer 127 is given regions corresponding to seven ink colors. That is, the head buffer 127 includes a set of a cyan (C and WC) region, a magenta (M and WM) region, a yellow (Y and WY) region, a black (K and WK) region, a light cyan (lc and Wlc) region, a light magenta (lm and Wlm) region and a white (W, WW) region.

The size of each region of the head buffer 127 in the X direction corresponds to the scanning distance of the carriage, the size thereof in the Y direction corresponds to the number of the nozzles which forms a nozzle array 146 of the print head 120. Further, the respective regions of the head buffer 127 corresponding to the ink colors are divided into two parts of the upstream head buffer 127*u* and the downstream head buffer 127*l*.

FIGS. 27A, 27B and 27C are diagrams illustrating a configuration of the print head 120 of the printer 100. As shown in FIGS. 27A and 27B, the print head 120 is provided with the nozzle arrays 146 each corresponding to seven ink colors. The nozzle arrays 146 are formed to be extended along the Y direction (printing medium feeding direction).

Further, as shown in FIG. 27C, each nozzle array 146 includes a group of 32 nozzles which are arranged along the Y direction. In this embodiment, among the nozzle group for forming the nozzle array 146, the nozzle group (nozzle 1 to nozzle 16) which are positioned on an upstream half side in the printing medium feeding direction is referred to as an upstream nozzle group, and the nozzle group (nozzle 17 to nozzle 32) which are positioned on a downstream half side in the printing medium feeding direction is referred to as a downstream nozzle group.

As shown in FIG. 27A, in the W-C printing, the toned white image is formed by means of the upstream nozzle group of each nozzle array 146 of the print head 120, and the color image is formed by means of the downstream nozzle group. Further, as shown in FIG. 27B, in the C-W printing, the color image is formed by means of the upstream nozzle group of each nozzle array 146 of the print head 120, and the toned white image is printed by means of the downstream nozzle group.

As shown in FIG. 26, the upstream head buffer 127*u* is a head buffer corresponding to the upstream nozzle group; and the downstream head buffer 127*l* is a head buffer corresponding to the downstream nozzle group.

In S335, it is determined whether the raster data is stored in the raster buffer 132 corresponding to a half of the height of the print head 120. In a case where the raster data is not stored in the raster buffer 132, the procedure goes to S380, and then updates the rater buffer pointer in S380. On the other hand, in a case where the raster data is stored in the raster buffer 132, the procedure goes to S340.

In S340, it is determined whether the printing order is the C-W printing or the W-C printing on the basis of the printing order designation information which is stored in the RAM 130. In a case where the printing order is the C-W printing, the procedure goes to S345; and in a case where the printing order is the W-C printing, the procedure goes to S350.

In S345, the raster data is transmitted from the color image raster buffer 132*c* to the upstream head buffer 127*u*, and the raster data is transmitted from the toned white image raster buffer 132*w* to the downstream head buffer 127*l*. Accordingly, the color image is formed by means of the upstream nozzle group of each nozzle array 146 of the print head 120, and the toned white image is formed by means of the downstream nozzle group.

In S350, the raster data is transmitted from the color image raster buffer 132*c* to the downstream head buffer 127*l*, and the raster data is transmitted from the toned white image raster buffer 132*w* to the upstream head buffer 127*u*. Accordingly, the toned white image is formed by means of the upstream nozzle group of each nozzle array 146 of the print head 120, and the color image is formed by means of the downstream nozzle group.

Since physical printing positions on a printing medium are different from each other in the upstream nozzle group and the downstream nozzle group, when the raster data is transmitted from the raster buffer 132, the transmission starting data position on the raster buffer is determined by setting a timing difference corresponding to the difference between the printing positions so that the raster data in which the upstream nozzle group and the downstream nozzle group correspond to each other is printed on a corresponding position on the printing medium.

In S355, the printing medium feeding controller 150 is controlled to transport the printing medium PM so that the print starting position of the printing medium PM coincides with the position of the printer head 120 in the sub scanning direction.

In S360, the carriage controller 135 is controlled to move the print head 120 so that the print starting position of the printing medium PM coincides with the position of the printer head 120 in the main scanning direction.

In S365, the printing is performed in the range corresponding to the length of the print head 120 in the sub scanning direction by means of the main scanning. At this time, the image by means of the upstream nozzle group and the image by means of the downstream nozzle group are formed in parallel.

In S370, the raster buffer pointer of the raster buffer 132 is cleared.

In S375, it is determined whether the printing for all the printing images PI is completed. In a case where the printing is not completed, the processes of S305 to S370 are repeatedly performed until it is determined that the printing is completed. In a case where the printing is completed, the printing process in FIG. 26 is terminated.

3. MODIFIED EXAMPLES

In the above described embodiment, a user sets the density of the toned white image by means of the toned white designation process, but the SML tables may be automatically rebuilt according to the image data or the printing setting. In a case where the SML tables are rebuilt according to the image data, it can be determined whether the rebuilding is to be performed on the basis of the granularity in the toned white image. For example, if the printing mode is a printing mode in which the ink cost is lowered (a printing mode in which the amount of ink ejection is restricted), the SML tables may be rebuilt; and if the printing mode is a mode in which the printing is performed with high quality or high accuracy (a printing mode in which the amount of ink ejection is not restricted), the SML tables may not be rebuilt.

Further, in the halftone process of the toned white image data, a halftone resource which is applied to ink of C, M, Y, K, lc, lm and the like other than the white ink is the same as a halftone resource which is applied to the white ink. Specifically, a pattern of a dither mask for the white ink and a pattern of a dither mask for the ink other than the white ink are shared. By sharing the dither masks in this way, the white ink and the other ink are printed in a dot-on-dot manner, and thus, deterioration of the granularity of the other ink can be prevented.

4. CONCLUSION

According to the above described embodiments, in the printer driver PD of the personal computer PC 200 which controls the toned white image when the toned white image is printed onto the transparent film by controlling the printer 100, the grayscale range in the SML tables T1 and T2, in which the correspondence relationship between the ink color grayscale value and the dot recording rate in the toned white image data WID is defined, is adjusted so that the density range of the color printed on the basis of the toned white image data WID is obtained on the basis of the density setting parameter T, and so that the grayscale value corresponding to the dot recording rate corresponding to the density range of the color is increased. According to the color saturation which is calculated by means of the input image data, the grayscale accuracy capable of being expressed can be adjusted, and the reproducibility of the color is improved.

The present invention is not limited to the above described embodiments or the modified examples, and may include, for example, a configuration in which the components disclosed in the above embodiments and the modified examples are exchanged or the combination of thereof is varied, or a configuration in which the components disclosed in the related art, the above embodiments and the modified examples are exchanged or the combination of thereof is varied.

What is claimed is:

1. A printing apparatus which is configured to control a white toned color in printing the white toned color to produce a basic image in a printing medium, comprising:
    a table in which a correspondence relationship between a grayscale value in image data of the white toned color and a dot recording rate is defined;
    a density designation receiving section which is configured to receive a designation of a density of the white toned color;
    an obtaining section which is configured to obtain a density range of a color which is to be printed using the image data of the white toned color, the density range of the color is to be obtained based on the density of the white toned color which is received by the density designation receiving section; and
    an adjustment section which is configured to rebuild the table by adjusting a grayscale range of the table so that the grayscale value corresponding to a dot recording rate range which corresponds to the density range of the color is increased.

2. The printing apparatus according to claim 1, wherein the adjustment section sets the grayscale value so that the grayscale range after the adjustment becomes an equivalent interval with respect to an ink discharge amount.

3. The printing apparatus according to claim 1, wherein the adjustment section sets the grayscale value so that an interval of the density of ink at the time when the ink adheres onto the printing medium according to an ink recording rate corresponding to each grayscale becomes an equivalent interval, with respect to the grayscale range after the adjustment.

4. The printing apparatus according to claim 1, wherein the adjustment section adjusts the grayscale range of the table with respect to a grayscale range which is obtained by adding a predetermined margin to the grayscale range obtained by the obtaining section.

5. The printing apparatus according to claim 1, further comprising:
   data which is configured to define a correspondence relationship between the density of the white toned color and a printing mode; and
   a mode designation receiving section which is configured to receive a designation of the printing mode,
   wherein the obtaining section obtains the density range of the color on the basis of the density corresponding to the designated printing mode, with reference to the data.

6. A printing program allowing a computer to realize a function of controlling a white toned color in printing the white toned color in a printing medium, comprising:
   a density designation receiving function of receiving a designation of a density of the white toned color;
   an obtaining function of obtaining a density range of a color which is to be printed using an image data of the white toned color, the density range of the color is to be obtained based on the density of the white toned color which is received; and
   an adjustment function of rebuilding a table in which a correspondence relationship between a grayscale value and a dot recording rate is defined, by adjusting a grayscale range of the table so that the grayscale value corresponding to a dot recording rate range which corresponds to the density range of the color is increased.

7. A printing method of controlling a white toned color in printing the white toned color in a printing medium using a computer, comprising:
   receiving a designation of a density of the white toned color;
   obtaining a density range of a color which is to be printed of using an image data of the white toned color, the density range of the color is to be obtained based on the density of the white toned color which is received; and
   rebuilding a table in which a correspondence relationship between a grayscale value and a dot recording rate is defined, by adjusting, a grayscale range of the table so that the grayscale value corresponding to a dot recording rate range which corresponds to the density range of the color is increased.

* * * * *